(12) United States Patent
Yang et al.

(10) Patent No.: US 10,123,306 B2
(45) Date of Patent: Nov. 6, 2018

(54) METHOD FOR ENHANCING COVERAGE IN WIRELESS COMMUNICATION SYSTEM, AND APPARATUS THEREFOR

(71) Applicant: LG ELECTRONICS INC., Seoul (KR)

(72) Inventors: Suckchel Yang, Seoul (KR); Joonkui Ahn, Seoul (KR); Hyangsun You, Seoul (KR); Yunjung Yi, Seoul (KR)

(73) Assignee: LG Electronics Inc., Seoul (KR)

(*) Notice: Subject to any disclaimer, the term of this patent is extended or adjusted under 35 U.S.C. 154(b) by 102 days.

(21) Appl. No.: 15/028,678

(22) PCT Filed: Oct. 14, 2014

(86) PCT No.: PCT/KR2014/009618
§ 371 (c)(1),
(2) Date: Apr. 11, 2016

(87) PCT Pub. No.: WO2015/056946
PCT Pub. Date: Apr. 23, 2015

(65) Prior Publication Data
US 2016/0262182 A1 Sep. 8, 2016

Related U.S. Application Data

(60) Provisional application No. 61/890,349, filed on Oct. 14, 2013, provisional application No. 61/907,369, (Continued)

(51) Int. Cl.
*H04W 72/04* (2009.01)
*H04L 1/18* (2006.01)
(Continued)

(52) U.S. Cl.
CPC .......... *H04W 72/04* (2013.01); *H04L 1/1854* (2013.01); *H04L 1/1858* (2013.01);
(Continued)

(58) Field of Classification Search
CPC ......... H04W 28/0278; H04W 72/1278; H04W 72/1284; H04W 28/04; H04W 28/26;
(Continued)

(56) References Cited

U.S. PATENT DOCUMENTS 9,641,302 B2 * 5/2017 Nakao ................... H04L 5/0048
9,743,433 B2 * 8/2017 Zhang ............... H04W 74/0891
(Continued)

FOREIGN PATENT DOCUMENTS

KR 1020120041659 A 5/2012
WO 2009020358 A1 2/2009
(Continued)

OTHER PUBLICATIONS

New Postcom: "UL Coverage Improvement and Evaluation for Low Cost MTC", 3GPP TSG-RAN WG1 Meeting #72bis, R1-131120, Apr. 15-19, 2013.
(Continued)

*Primary Examiner* — Robert M Morlan
(74) *Attorney, Agent, or Firm* — Dentons US LLP

(57) ABSTRACT

The present invention relates to a wireless communication system. More specifically, the present invention relates to a method and an apparatus by which a terminal transmits an uplink channel in a wireless communication system, the method comprising the steps of: performing a PUCCH resource allocation process for the repeated transmission of an SR; performing the PUCCH resource allocation process for the repeated transmission of an HARQ-ACK; and checking whether the section of the repeated transmission of the SR and the section of the repeated transmission of the HARQ-ACK overlap; wherein, if the section of the repeated transmission of the SR and the section of the repeated
(Continued)

Channels/signals are overlapped or collided transmission of the HARQ-ACK overlap, the transmission of at least one of the SR and the HARQ-ACK is controlled depending on the conditions.

18 Claims, 12 Drawing Sheets

Related U.S. Application Data filed on Nov. 21, 2013, provisional application No. 61/910,971, filed on Dec. 3, 2013, provisional application No. 61/917,359, filed on Dec. 18, 2013, provisional application No. 61/919,823, filed on Dec. 23, 2013.

(51) Int. Cl.
| | |
|---|---|
| *H04L 5/00* | (2006.01) |
| *H04W 74/04* | (2009.01) |
| *H04W 74/08* | (2009.01) |
| *H04W 4/70* | (2018.01) |
| *H04L 5/14* | (2006.01) |

(52) U.S. Cl.
CPC .......... *H04L 1/1861* (2013.01); *H04L 5/0055* (2013.01); *H04W 4/70* (2018.02); *H04W 74/04* (2013.01); *H04W 74/0833* (2013.01); *H04L 5/0023* (2013.01); *H04L 5/14* (2013.01)

(58) Field of Classification Search
CPC ....... H04L 1/18; H04L 1/1864; H04L 1/1861; H04L 1/1607; H04L 1/1896
See application file for complete search history.

(56) References Cited

U.S. PATENT DOCUMENTS

| | | | |
|---|---|---|---|
| 2010/0046460 | A1 | 2/2010 | Kwak et al. |
| 2012/0099545 | A1 | 4/2012 | Han et al. |
| 2012/0220286 | A1 | 8/2012 | Chen et al. |
| 2012/0250558 | A1 | 10/2012 | Chung et al. |
| 2013/0235768 | A1* | 9/2013 | Earnshaw ............ H04L 1/1671 370/280 |
| 2015/0146632 | A1* | 5/2015 | Wu ........................ H04L 1/1854 370/329 |
| 2016/0094996 | A1* | 3/2016 | Xiong ...................... H04L 1/16 370/329 |
| 2017/0150447 | A1* | 5/2017 | Kim .................. H04W 52/0241 |

FOREIGN PATENT DOCUMENTS

| | | |
|---|---|---|
| WO | 2011078582 A2 | 6/2011 |
| WO | 2012144865 A2 | 10/2012 |
| WO | 2013012190 A2 | 1/2013 |
| WO | 2013125908 A1 | 8/2013 |

OTHER PUBLICATIONS

Intel Corporation: "Coverage enhancement of DL/UL control channels for low cost MTC", 3GPP TSG-RAN WG1 #74bis, R1-134131, Oct. 7-11, 2013.

New Postcom; "Discussion on uplink coverage enhancement for low cost MTC (PRACH & PUCCH)", 3GPP TSG-RAN WG1 Meeting #74bis, R1-134460, Oct. 7-11, 2013.

NTT DoCoMo: "Discussion on Multi-level PRACH Coverage Enhancement", 3GPP TSG RAN WG1 Meeting #74bis, R1-134493, Oct. 7-11, 2013.

* cited by examiner

PDSCH-ACK/NACK timing (UL-DL configuration #1)

PHICH/UL grant-PUSCH timing (UL-DL configuration #1)

PUSCH-PHICH/UL grant timing (UL-DL configuration #1)

HARQ processes in UL-DL configuration #1

FIG. 19
(a) ACK/NACK: Number of repetitions = 3
(b) SR: Transmission interval = 10 SF, Number of repetitions = 4
FIG. 20
 Channels/signals are overlapped or collided
FIG. 21
 Channels/signals are overlapped or collided
* Ch1 and/or Ch2 is dropped depending on conditions.

TA timer is expired or expected to be expired
during repetitive transmissions

METHOD FOR ENHANCING COVERAGE IN WIRELESS COMMUNICATION SYSTEM, AND APPARATUS THEREFOR

This application is a National Stage Application of International Application No. PCT/KR2014/009618, filed on Oct. 14, 2014, which claims the benefit of U.S. Provisional Application No. 61/890,349, filed on Oct. 14, 2013, U.S. Provisional Application No. 61/907,369, filed on Nov. 21, 2013, U.S. Provisional Application No. 61/910,971, filed on Dec. 3, 2013, U.S. Provisional Application No. 61/917,359, filed on Dec. 18, 2013 and U.S. Provisional Application No. 61/919,823, filed on Dec. 23, 2013, all of which are hereby incorporated by reference in their entirety for all purposes as if fully set forth herein.

TECHNICAL FIELD

The present invention relates to a method for enhancing coverage and an apparatus therefor and, more particularly, to a signal transmission method for coverage enhancement and an apparatus therefor. The present invention is applicable to coverage enhancement of machine type communication (MTC).

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi Carrier Frequency Division Multiple Access (MC-FDMA) system. In a wireless communication system, a User Equipment (UE) may receive information from a Base Station (BS) on a Downlink (DL) and transmit information to the BS on an Uplink (UL). The UE transmits or receives data and various types of control information. Various physical channels exist according to the types and usages of information that the UE transmits or receives.

DISCLOSURE

Technical Problem

An object of the present invention devised to solve the problem lies in a method for efficiently enhancing coverage in a wireless communication system and an apparatus for the same. Specifically, an object of the present invention is to provide an efficient signal transmission method for coverage enhancement and an apparatus for the same.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method of transmitting an uplink channel by a user equipment (UE) in a wireless communication includes: performing a physical uplink control channel (PUCCH) resource allocation process for repetitive transmission of a scheduling request (SR); performing the PUCCH resource allocation process for repetitive transmission of HARQ-ACK; and checking whether a repetitive transmission duration of the SR and a repetitive transmission duration of the HARQ-ACK overlap, wherein transmission of at least one of the SR and the HARQ-ACK is controlled according to conditions when the repetitive transmission duration of the SR and the repetitive transmission duration of the HARQ-ACK overlap, wherein the number of repetitions set to the SR is Ns, the number of repetitions set to the HARQ-ACK is Na, and the number of repetitions of overlapping of the repetitive transmission duration of the SR and the repetitive transmission duration of the HARQ-ACK is No.

In another aspect of the present invention, a UE used in a wireless communication includes: a radio frequency (RF) unit; and a processor, wherein the processor is configured to perform a PUCCH resource allocation process for repetitive transmission of an SR, to perform the PUCCH resource allocation process for repetitive transmission of HARQ-ACK and to check whether a repetitive transmission duration of the SR and a repetitive transmission duration of the HARQ-ACK overlap, wherein transmission of at least one of the SR and the HARQ-ACK is controlled according to conditions when the repetitive transmission duration of the SR and the repetitive transmission duration of the HARQ-ACK overlap, wherein the number of repetitions set to the SR is Ns, the number of repetitions set to the HARQ-ACK is Na, and the number of repetitions of overlapping of the repetitive transmission duration of the SR and the repetitive transmission duration of the HARQ-ACK is No.

When transmission of the SR and transmission of the HARQ-ACK start at the same time and when the repetitive transmission duration of the SR includes the entire repetitive transmission duration of the HARQ-ACK, the HARQ-ACK may be transmitted Ns times using PUCCH resources for the SR for the repetitive transmission duration of the SR.

When transmission of the SR and transmission of the HARQ-ACK start at the same time and when the repetitive transmission duration of the SR includes the entire repetitive transmission duration of the HARQ-ACK, the HARQ-ACK may be transmitted Na times using PUCCH resources for the SR only for the repetitive transmission duration of the HARQ-ACK.

When transmission of the SR and transmission of the HARQ-ACK start at the same time and when the repetitive transmission duration of the SR includes the entire repetitive transmission duration of the HARQ-ACK, the HARQ-ACK may be transmitted Na times using PUCCH resources for the SR for the repetitive transmission duration of the SR and then NACK is transmitted (Ns-Na) times using PUCCH resources for the SR.

PUCCH resources allocated to the SR may differ from PUCCH resources allocated to the HARQ-ACK, and the repetitive transmission duration of the SR and the repetitive transmission duration of the HARQ-ACK may be configured to completely overlap.

PUCCH resources allocated to the SR may be identical to PUCCH resources allocated to the HARQ-ACK, and the repetitive transmission duration of the SR and the repetitive transmission duration of the HARQ-ACK may be configured not to overlap.

Advantageous Effects

According to embodiments of the present invention, efficient coverage enhancement can be achieved in a wireless communication system and an efficient signal transmission method for coverage enhancement can be provided.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 19 illustrates channel/signal transmission when repetitive transmission is applied;

FIG. 20 illustrates a case in which transmission periods overlap between a plurality of channels/signals;

FIG. 21 illustrates a case in which repeated transmission periods of uplink channels overlap;

BEST MODE

The configuration, operation, and other features of the present invention will readily be understood with embodiments of the present invention described with reference to the attached drawings. Embodiments of the present invention may be used for various radio access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), Multi-Carrier Frequency Division Multiple Access (MC-FDMA), etc. CDMA may be implemented as a radio technology such as Universal Terrestrial Radio Access (UTRA) or CDMA2000. TDMA may be implemented as a radio technology such as Global System for Mobile communications/General packet Radio Service/Enhanced Data Rates for GSM Evolution (GSM/GPRS/EDGE). OFDMA may be implemented as a radio technology such as Institute of Electrical and Electronic Engineers (IEEE) 802.11 (Wi-Fi), IEEE 802.16 (WiMAX), IEEE 802.20, Evolved UTRA (E-UTRA), etc. UTRA is a part of Universal Mobile Telecommunications System (UMTS). $3^{rd}$ Generation Partnership Project Long Term Evolution (3GPP LTE) is a part of Evolved UMTS (E-UMTS) using E-UTRA, and LTE-Advanced (LTE-A) is an evolution of 3GPP LTE.

While the embodiments of the present invention will be described below mainly in the context of a 3GPP system, this is purely exemplary and thus should not be construed as limiting the present invention.

While the present invention is described in the context of an LTE-A system, the proposed concept or methods of the present invention and embodiments of the proposed concept or methods are applicable to other multi-carrier systems (e.g., an IEEE 802.xx system) without restriction.

Figure 1:
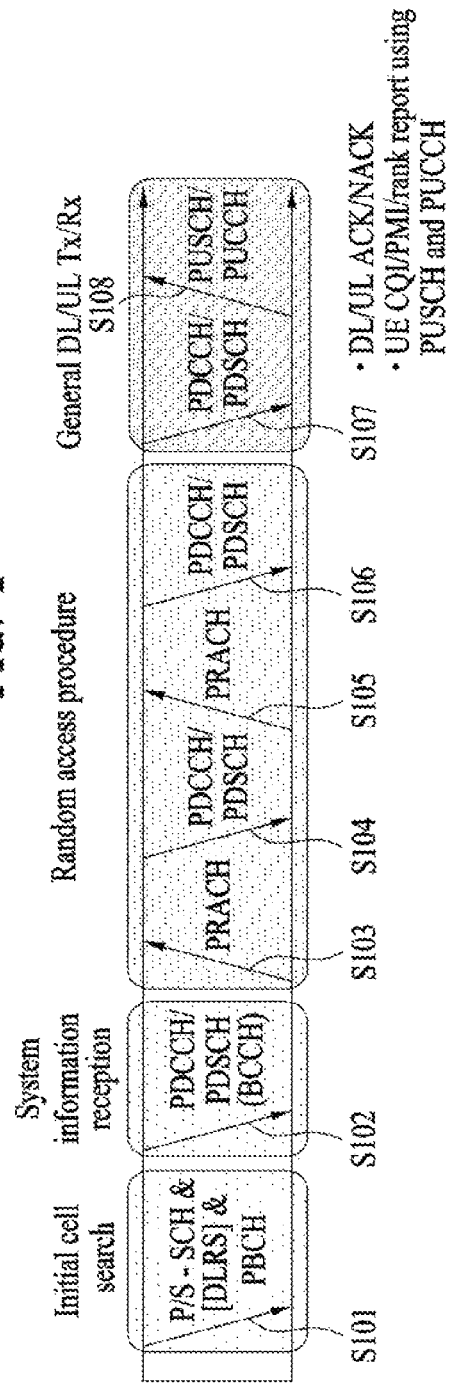
FIG. 1 illustrates physical channels and a general signal transmission method using the physical channels.

FIG. 1 illustrates physical channels and a general method for transmitting signals.

Referring to FIG. 1, when a User Equipment (UE) is powered on or enters a new cell, the UE performs initial cell search in step S101. The initial cell search involves acquisition of synchronization to an evolved Node B (eNB). Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information (i.e., a Master Information Block (MIB)) broadcast in the cell by receiving a Physical Broadcast Channel (PBCH) from the eNB. During the initial cell search, the UE may monitor a Downlink (DL) channel state by receiving a DownLink Reference Signal (DL RS).

After the initial cell search, the UE acquires detailed system information (i.e. a System Information Block (SIB)) by receiving a Physical Downlink Control Channel (PDCCH) and receiving a Physical Downlink Shared Channel (PDSCH) based on information included in the PDCCH in step S102.

Then, the UE may perform a random access procedure with the eNB to complete the connection to the eNB in step S103 to S106. In the random access procedure, the UE may transmit a preamble on a Physical Random Access Channel (PRACH) (S103) and may receive a response message to the preamble on a PDCCH and a PDSCH associated with the PDCCH (S104). In the case of contention-based random access, the UE additionally performs a contention resolution procedure including transmission of a Physical Uplink Shared Channel (PUSCH) (S105) and reception of a PDCCH and its associated PDSCH (S106).

After the above procedure, the UE may receive a PDCCH/PDSCH (S107) and transmit a PUSCH/PUCCH (S108) in a general UL/DL signal transmission procedure.

Figure 2:
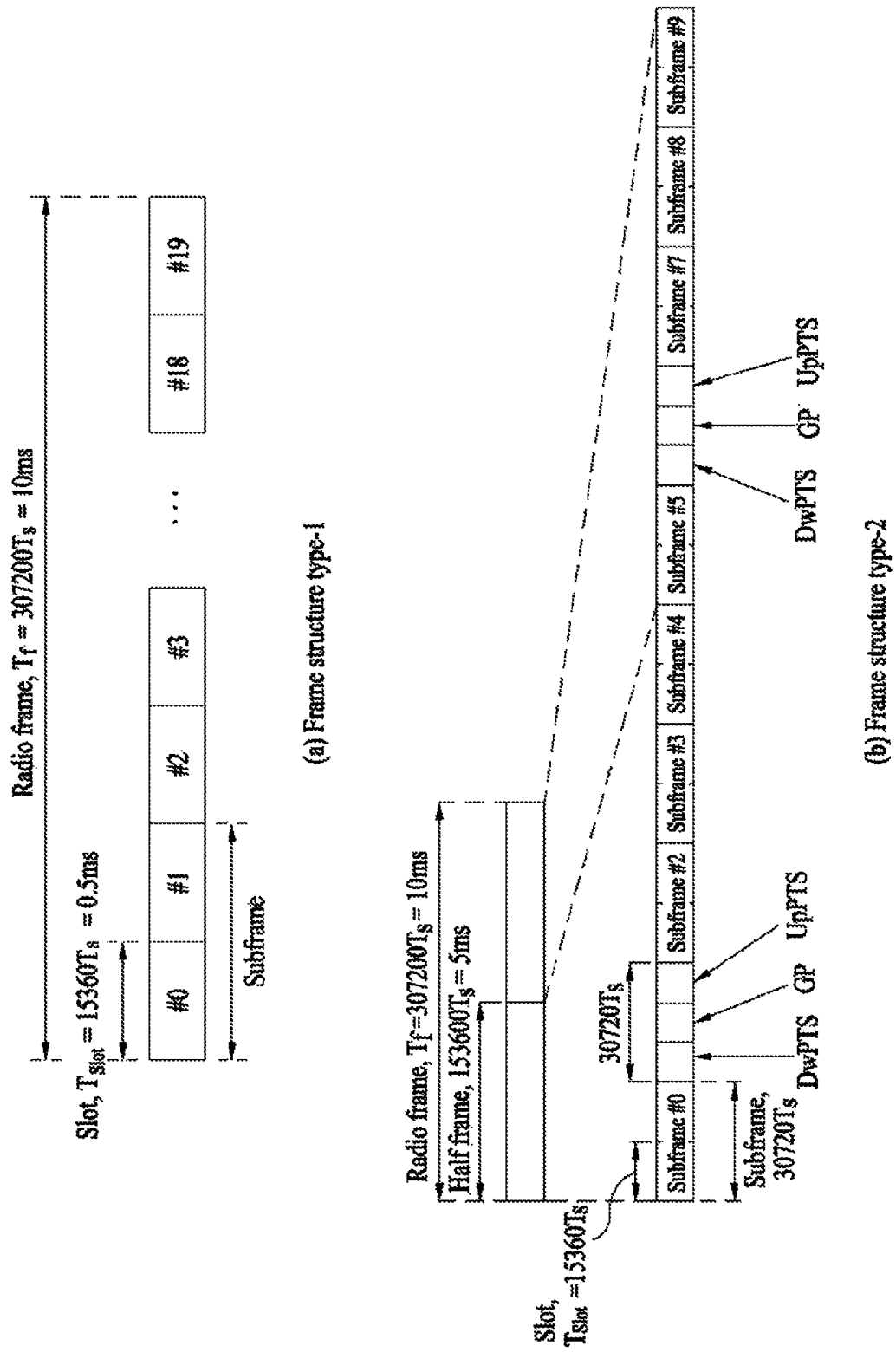
FIG. 2 illustrates a radio frame structure.

FIG. 2 illustrates a radio frame structure. The 3GPP LTE/LTE-A standards support a type 1 radio frame structure applicable to Frequency Division Duplex (FDD) and a type 2 radio frame structure applicable to Time Division Duplex (TDD).

FIG. 2(a) is a diagram illustrating the structure of the type 1 radio frame. An FDD radio frame includes only DL subframes or only UL subframes. The radio frame includes 10 subframes, each subframe including two slots in the time domain. One subframe may be 1 ms long and one slot may be 0.5 ms long. One slot includes a plurality of (DL) OFDM symbols or a plurality of (UL) SC-FDMA symbols in the time domain.

FIG. 2(b) illustrates the structure of the type 2 radio frame. A TDD radio frame includes two half frames, each half frame including four (five) general subframes and one (zero) special subframe. The general subframes are used for UL or DL according to a UL-DL configuration and the special subframe includes a Downlink Pilot Time Slot (DwPTS), a Guard Period (GP), and an Uplink Pilot Time Slot (UpPTS). A subframe includes two slots.

Table 1 lists exemplary subframe configurations for a radio frame according to UL-DL configurations.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In [Table 1], D represents a DL subframe, U represents a UL subframe, and S represents a special subframe.

Figure 3:
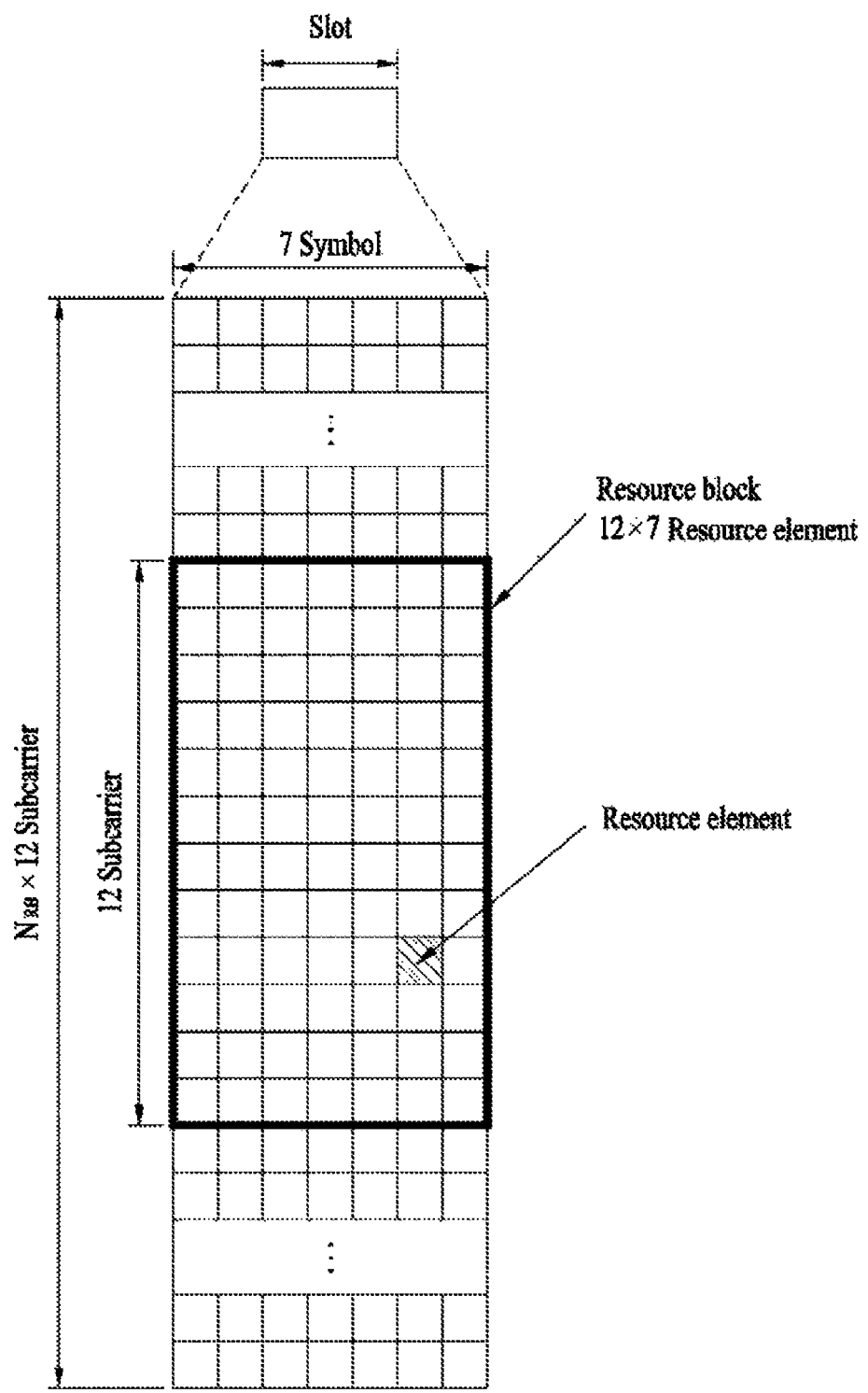
FIG. 3 illustrates a resource grid for the duration of a slot.

FIG. 3 illustrates a resource grid for the duration of one slot. A slot includes a plurality of symbols (e.g., OFDM symbols or SC-FDMA symbols), for example, 6 or 7 symbols in the time domain by a plurality of Resource Blocks (RBs) in the frequency domain. Each RB includes 12 subcarriers. Each element of a resource grid is called a Resource Element (RE). The RE is a minimum resource unit for signal transmission and one modulation symbol is mapped to an RE.

Figure 4:
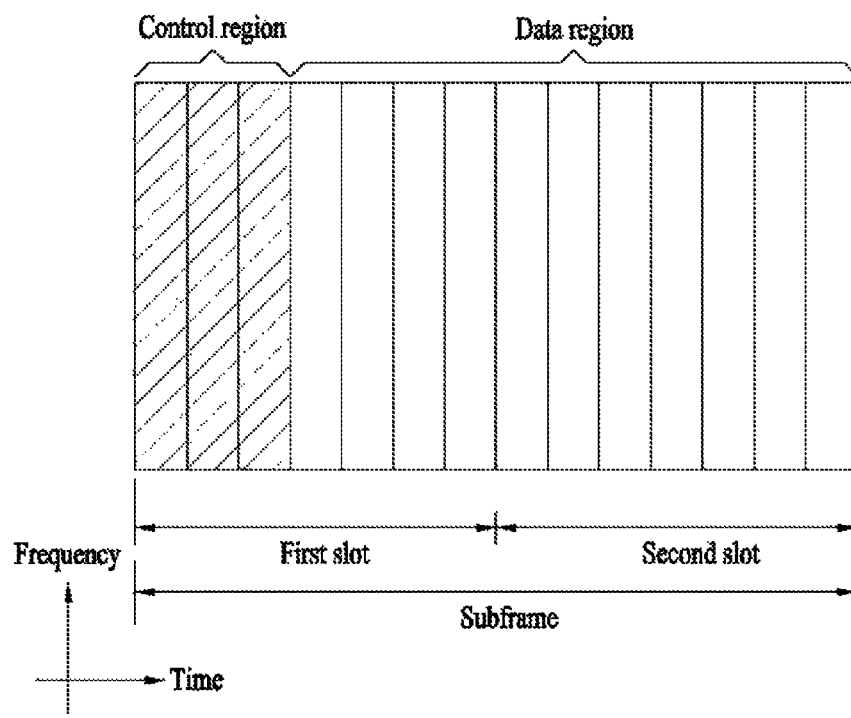
FIG. 4 illustrates an exemplary downlink (DL) subframe (SF) structure.

FIG. 4 illustrates a structure of a DL subframe. Up to 3 (or 4) OFDM symbols at the start of the first slot of a DL subframe are used as a control region to which a control channel is allocated and the remaining OFDM symbols of the DL subframe are used as a data region to which a shared channel (e.g., a PDSCH) is allocated. DL control channels include a Physical Control Format Indicator Channel (PCFICH), a PDCCH, a Physical Hybrid automatic repeat request (ARQ) Indicator Channel (PHICH), etc.

The PCFICH is located in the first OFDM symbol of a subframe, carrying information about the number of OFDM symbols used for transmission of control channels in the subframe. The PCFICH indicates a value ranging 1 to 3 (or 2 to 4) and is modulated in Quadrature Phase Shift Keying (QPSK). The PHICH delivers an HARQ ACKnowledgment/Negative ACKnowledgment (ACK/NACK) signal as a response to a UL transmission.

The PDCCH delivers information about resource allocation and a transport format for a Downlink Shared Channel (DL-SCH), information about resource allocation and a transport format for an Uplink Shared Channel (UL-SCH), paging information of a Paging Channel (PCH), system information on the DL-SCH, information about resource allocation for a higher-layer control message such as a random access response transmitted on the PDSCH, a set of transmission power control commands for individual UEs of a UE group, a Transmit Power Control (TPC) command, Voice Over Internet Protocol (VoIP) activation indication information, etc.

Control information transmitted on a PDCCH is called Downlink Control Information (DCI). Various DCI formats are defined according to the usages of the DCI. Specifically, DCI formats 0 and 4 (a UL grant) are defined for UL scheduling and DCI formats 1, 1A, 1B, 1C, 1D, 2, 2A, 2B, and 2C (a DL grant) are defined for DL scheduling. Depending on its usage, a DCI format selectively includes information such as a hopping flag, an RB assignment, a Modulation Coding Scheme (MCS), a Redundancy Version (RV), a New Data Indicator (NDI), a TPC, a cyclic shift, a DeModulation Reference Signal (DM-RS), a Channel Quality Information (CQI) re quest, an HARQ process number, a Transmitted Precoding Matrix Indicator (TPMI), Precoding Matrix Indicator (PMI) confirmation, etc.

An eNB determines a PDCCH format according to control information to be transmitted to a UE and adds a Cyclic Redundancy Check (CRC) to the control information, for error detection. The CRC is masked by an ID (e.g., a Radio Network Temporary Identifier (RNTI)) according to the owner or usage of a PDCCH. In other words, the PDCCH is CRC-scrambled with the ID (e.g., the RNTI).

Table 2 lists exemplary IDs by which a PDCCH is masked.

TABLE 2

| Type | Identifier | Description |
|---|---|---|
| UE-specific | C-RNTI, TC-RNTI, SPS C-RNTI | used for a unique UE identification |
| Common | P-RNTI | used for paging message |
| | SI-RNTI | used for system information |
| | RA-RNTI | used for random access response |

If a C-RNTI, a Temporary C-RNTI (TC-RNTI), and a Semi-Persistent Scheduling C-RNTI (SPS C-RNTI) are used, the PDCCH delivers UE-specific control information for a specific UE. If other RNTIs are used, the PDCCH delivers common control information for all UEs in a cell.

PDSCH transmission schemes according to TMs and information content of DCI formats are given as follows.

TMs
TM 1: transmission from a single eNB antenna port
TM 2: transmit diversity
TM 3: open-loop spatial multiplexing
TM 4: closed-loop spatial multiplexing
TM 5: Multi-User Multiple Input Multiple Output (MU-MIMO)
TM 6: closed-loop rank-1 precoding
TM 7: single-antenna port (port 5) transmission
TM 8: double-layer transmission (port 7 and port 8) or single-antenna port (port 7 or port 8) transmission
TMs 9 and 10: up to 8-layer transmission (port 7 to port 14) or single-antenna port (port 7 or port 8) transmission DCI Formats
format 0: resource grant for PUSCH transmission
format 1: resource allocation for single-codeword PDSCH transmission (TMs 1, 2 and 7)

format 1A: compact signaling of resource allocation for single-codeword PDSCH (all modes)
format 1B: compact resource allocation for PDSCH (mode 6) using rank-1 closed-loop precoding
format 1C: very compact resource allocation for PDSCH (e.g., paging/broadcast system information)
format 1D: compact resource allocation for PDSCH using MU-MIMO (mode 5)
format 2: resource allocation for PDSCH of closed-loop MIMO operation (mode 4)
format 2A: resource allocation for PDSCH of open-loop MIMO operation (mode 3)
format 3/3A: power control command having 2-bit/1-bit power control value for PUCCH and PUSCH
format 4: resource grant for PUSCH transmission in a cell set to multi-antenna port transmission mode DCI formats may be classified into a TM-dedicated format and a TM-common format. The TM-dedicated format is a DCI format configured for a corresponding TM only, and the TM-common format is a DCI format configured commonly for all TMs. For example, DCI format 2B may be a TM-dedicated DCI format for TM 8, DCI format 2C may be a TM-dedicated DCI format for TM 9, and DCI format 2D may be a TM-dedicated DCI format for TM 10. DCI format 1A may be a TM-common DCI format.

Figure 5:
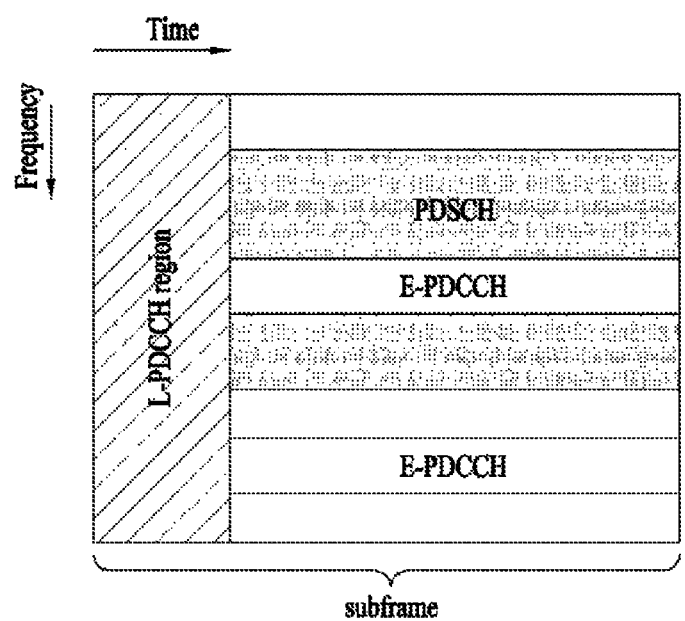
FIG. 5 illustrates an example of allocating Enhanced Physical Downlink Control Channels (E-PDCCHs) to an SF.

FIG. 5 illustrates an example of allocating Enhanced PDCCHs (E-PDCCHs) to a subframe. A legacy LTE system has limitations such as transmission of a PDCCH in limited OFDM symbols. Accordingly, LTE-A has introduced the E-PDCCH for more flexible scheduling.

Referring to FIG. 5, a PDCCH conforming legacy LTE (-A) (referred to as a legacy PDCCH or L-PDCCH) may be allocated to a control region (refer to FIG. 4). A PDCCH may be additionally allocated to a data region (refer to FIG. 4). The PDCCH allocated to the data region is referred to as an E-PDCCH. As illustrated in FIG. 5, a scheduling constraint imposed by the limited control channel resources of the L-PDCCH region may be relieved by additionally securing control channel resources through the E-PDCCH. An E-PDCCH and a PDSCH are multiplexed in Frequency Division Multiplexing (FDM) in the data region.

The E-PDCCH may be detected/demodulated based on DM-RS. The E-PDCCH is transmitted in a Physical Resource Block (PRB) pair along the time axis. If E-PDCCH-based scheduling is configured, a subframe in which an E-PDCCH will be transmitted/detected may be indicated.

Like the L-PDCCH, the E-PDCCH delivers DCI. For example, the E-PDCCH may deliver DL scheduling information and UL scheduling information. An E-PDCCH/PDSCH operation and an E-PDCCH/PUSCH operation are performed in the same manner as/a similar manner to steps S107 and S108 of FIG. 1. That is, a UE may receive an E-PDCCH and receive data/control information on a PDSCH corresponding to the E-PDCCH. In addition, the UE may receive an E-PDCCH and transmit data/control information on a PUSCH corresponding to the E-PDCCH.

Figure 6:
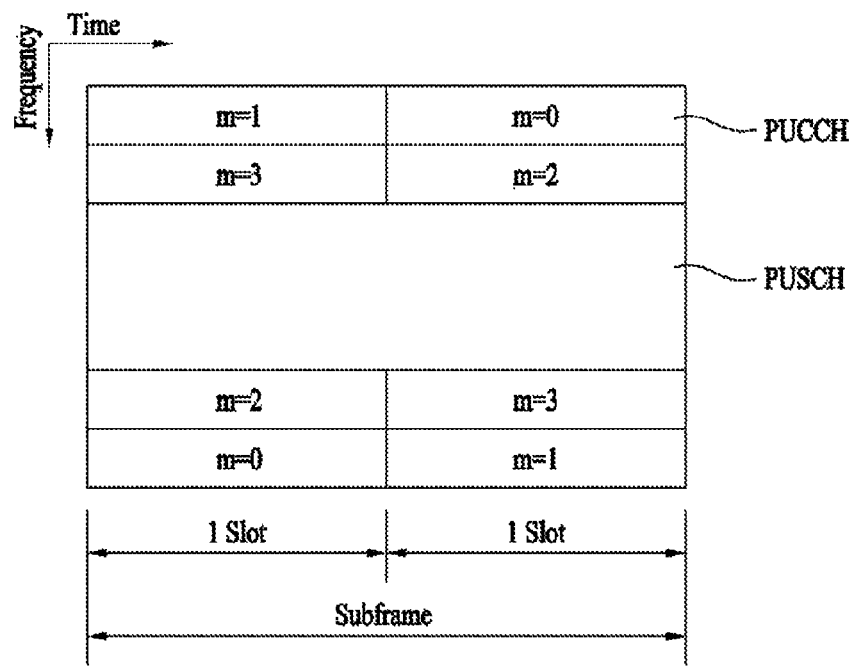
FIG. 6 illustrates an Uplink (UL) SF structure.

FIG. 6 illustrates a structure of a UL subframe in the LTE/LTE-A system.

Referring to FIG. 6, a UL subframe includes a plurality of slots (e.g. 2 slots). Each slot may include a different number of SC-FDMA symbols according to a Cyclic Prefix (CP) length. The UL subframe is divided into a control region and a data region in the frequency domain. A PUSCH carrying a data signal such as voice or the like is transmitted in the data region, and a PUCCH carrying Uplink Control Information (UCI) is transmitted in the control region. The PUCCH includes an RB pair located at both ends of the data region along the frequency axis and hops over a slot boundary.

The PUCCH may carry the following control information.
Scheduling Request (SR): information used to request UL-SCH resources. The SR is transmitted in On-Off Keying (OOK).
HARQ response: a response signal to a DL data block (e.g., a Transport Block (TB)) or a CodeWord (CW) on a PDSCH. The HARQ response indicates whether the DL data block has been received successfully. A 1-bit ACK/NACK is transmitted as a response to a single DL codeword and a 2-bit ACK/NACK is transmitted as a response to two DL codewords. A HARQ-ACK response includes positive ACK (simply, ACK), negative ACK (simply, NACK) and DTX (discontinuous transmission). HARQ-ACK can be used interchangeably with HARQ ACK/NACK, ACK/NACK and AN.
Channel Quality Indicator (CSI): feedback information for a DL channel. The CSI includes a CQI (Channel Quality Indicator), RI (Rank Indicator) and PMI (Precoding Matrix Indicator). The CSI may be used interchangeably with the CQI.

While UCI is transmitted over a PUCCH in general, the UCI may be transmitted through a PUSCH when the UCI and UL-SCH need to be simultaneously transmitted. In addition, the UCI (e.g. CSI) may be aperiodically transmitted through a PUSCH at the request/instruction of a network.

An SR can be transmitted in a periodically configured subframe (referred to as an SR subframe). In the case of positive SR in the SR subframe (i.e. when UL-SCH resource allocation is required), a UE transmits a signal using a PUCCH format 1 resource (referred to as an SR PUCCH resource hereinafter) in the SR subframe. The SR PUCCH resource is semi-statically allocated by a higher layer. In the case of a negative SR in the SR subframe (i.e. when UL-SCH resource allocation is not required or allocated UL-SCH resources remain), the UE transmits no signal in the SR subframe. PUCCH format 1a/1b resources (referred to as HARQ-ACK PUCCH resources hereinafter) for HARQ-ACK are dynamically allocated using PDCCH transmission resources. In transmission of HARQ-ACK in the SR subframe, HARQ-ACK is transmitted using an SR PUCCH resource in the case of positive SR and transmitted using a HARQ-ACK PUCCH resource in the case of negative SR.

The amount of UCI that a UE may transmit in a subframe depends on the number of SC-FDMA symbols available for transmission of the UCI. The SC-FDMA symbols available for transmission of the UCI are the remaining SC-FDMA symbols except SC-FDMA symbols configured for transmitting RSs in the subframe. The last SC-FDMA symbol of a subframe configured to carry an SRS is additionally excluded from the SC-FDMA symbols available for transmission of the UCI. An RS is used for coherent detection of a PUCCH. A PUCCH supports 7 formats according to information carried on the PUCCH.

Table 3 illustrates a mapping relationship between PUCCH formats and UCI in the LTE system.

TABLE 3

| PUCCH format | Uplink Control Information (UCI) |
|---|---|
| format 1 | SR(Scheduling Request) (non-modulated waveform) |
| format 1a | 1-bit HARQ ACK/NACK (SR present/absent) |
| format 1b | 2-bit HARQ ACK/NACK (SR present/absent) |

TABLE 3-continued

| PUCCH format | Uplink Control Information (UCI) |
|---|---|
| format 2 | CQI (20 coded bits) |
| format 2 | CQI and 1- or 2-bit HARQ ACK/NACK (20 bits) (only in case of extended CP) |
| format 2a | CQI and 1-bit HARQ ACK/NACK (20 + 1 coded bits) |
| format 2b | CQI and 2-bit HARQ ACK/NACK (20 + 2 coded bits) |

An SRS is periodically or aperiodically transmitted through the last SC-FDMA symbol of a subframe. An SRS subframe is configured according to a cell-specific SRS parameter and a UE-specific SRS parameter. The cell-specific parameter indicates subframes occupied for SRS transmission in a cell to a UE and the UE-specific parameter indicates a subframe to be used by the UE from among the subframes occupied for SRS transmission. Periodic SRS (p-SRS) transmission is performed in a predetermined period. To this end, an SRS transmission period $T_{SRS}$ and an SRS subframe offset $T_{offset}$ are set per UE. Aperiodic SRS (a-SRS) transmission is signaled using DG/UG DCI. Upon reception of an SRS request, a UE transmits an SRS in the first SRS transmittable subframe appearing after 4 subframes. A subframe in which aperiodic SRS transmission can be performed is periodically configured. To this end, a separate SRS transmission period $T_{SRS,1}$ and an SRS subframe offset $T_{offset,1}$ are set.

A description will be given of signal transmission timing of a UE with reference to FIGS. 7 to 13. TDD signal transmission timing is illustrated in the figures for convenience and FDD signal transmission timing will be additionally described.

Figure 7:
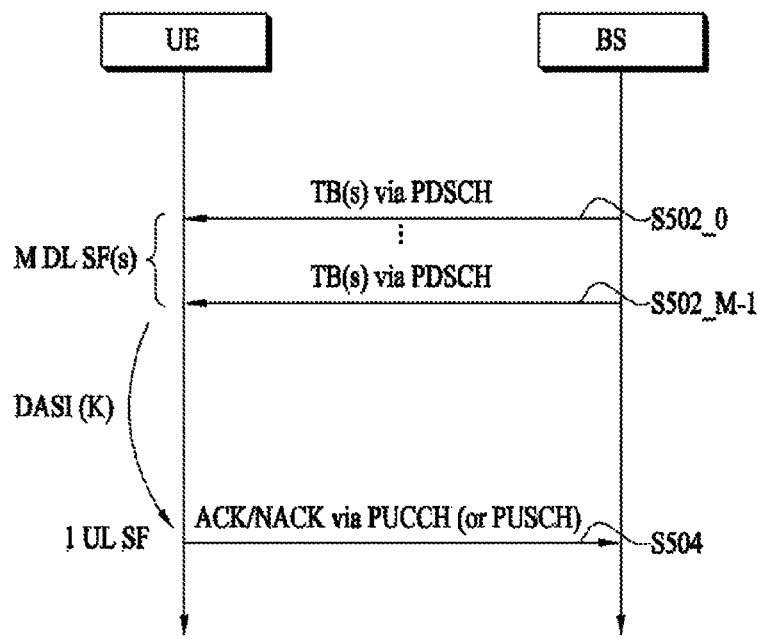
FIGS. 7 and 8 illustrate TDD UL ACK/NACK (Uplink Acknowledgement/Negative Acknowledgement) transmission timing.
Figure 8:
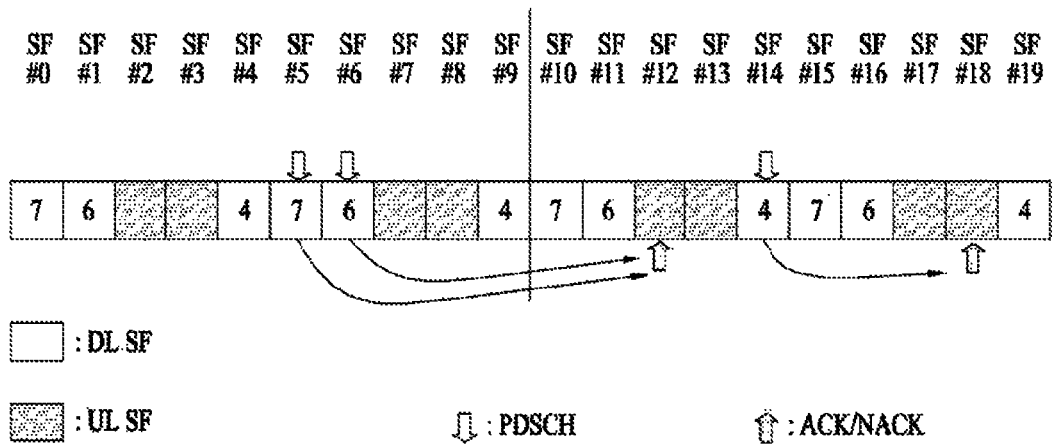

FIGS. 7 and 8 illustrate PDSCH-UL ACK/NACK timing. Here, UL ACK/NACK means ACK/NACK transmitted on uplink, as a response to DL data (e.g. PDSCH).

Referring to FIG. 7, a UE can receive one or more PDSCH signals in M DL subframes (SFs) (S502_0 to S502_M−1). Each PDSCH signal is used to transmit one or more (e.g. 2) transport blocks (TBs) according to transmission mode. A PDCCH signal indicating SPS (Semi-Persistent Scheduling) may also be received in step S502_0 to S502_M−1, which is not shown. When a PDSCH signal and/or an SPS release PDCCH signal is present in the M DL subframes, the UE transmits ACK/NACK through a UL subframe corresponding to the M DL subframes via processes for transmitting ACK/NACK (e.g. ACK/NACK (payload) generation, ACK/NACK resource allocation, etc.) (S504). ACK/NACK includes acknowledgement information about the PDSCH signal and/or an SPS release PDCCH received in step S502_0 to S502_M−1. While ACK/NACK is transmitted through a PUCCH basically, ACK/NACK is transmitted through a PUSCH when a PUSCH is transmitted at ACK/NACK transmission time. Various PUCCH formats shown in Table 3 can be used for ACK/NACK transmission. To reduce the number of ACK/NACK bits transmitted through a PUCCH format, various methods such as ACK/NACK bundling and ACK/NACK channel selection can be used.

As described above, in TDD, ACK/NACK relating to data received in the M DL subframes is transmitted through one UL subframe (i.e. M DL SF(s): 1 UL SF) and the relationship therebetween is determined by a DASI (Downlink Association Set Index).

Table 4 shows DASI (K: {k0, k1, . . . , k−1}) defined in LTE(-A). Table 4 shows spacing between a UL subframe transmitting ACK/NACK and a DL subframe relating to the UL subframe. Specifically, when a PDCCH that indicates PDSCH transmission and/or SPS release is present in a subframe n-k (k∈K), the UE transmits ACK/NACK in a subframe n. For FDD, M=1 and k=4.

TABLE 4

| TDD UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

FIG. 8 illustrates UL ACK/NACK transmission timing when UL-DL configuration #1 is configured. In the figure, SF#0 to #9 and SF#10 to #19 respectively correspond to radio frames, and numerals in blocks denote UL subframes relating to DL subframes. For example, ACK/NACK for a PDSCH of SF#5 is transmitted in SF#5+7 (=SF#12) and ACK/NACK for a PDSCH of SF#6 is transmitted in SF#6+6 (=SF#12). Accordingly, both ACKs/NACKs for DL signals of SF#5/#6 are transmitted in SF#12. Similarly, ACK/NACK for a PDSCH of SF#14 is transmitted in SF#14+4 (=SF#18).

Figure 9:
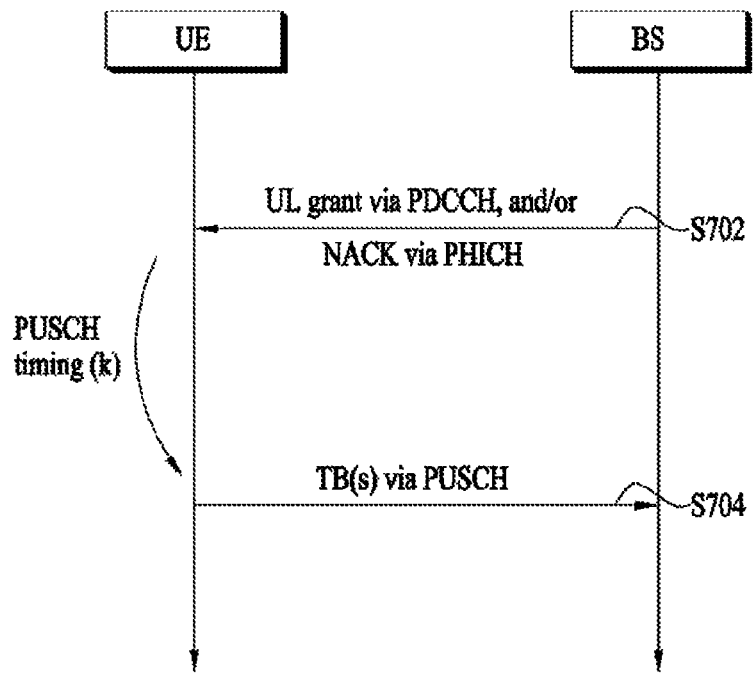
FIGS. 9 and 10 illustrate TDD PUSCH (Physical Uplink Shared Channel) transmission timing.
Figure 10:
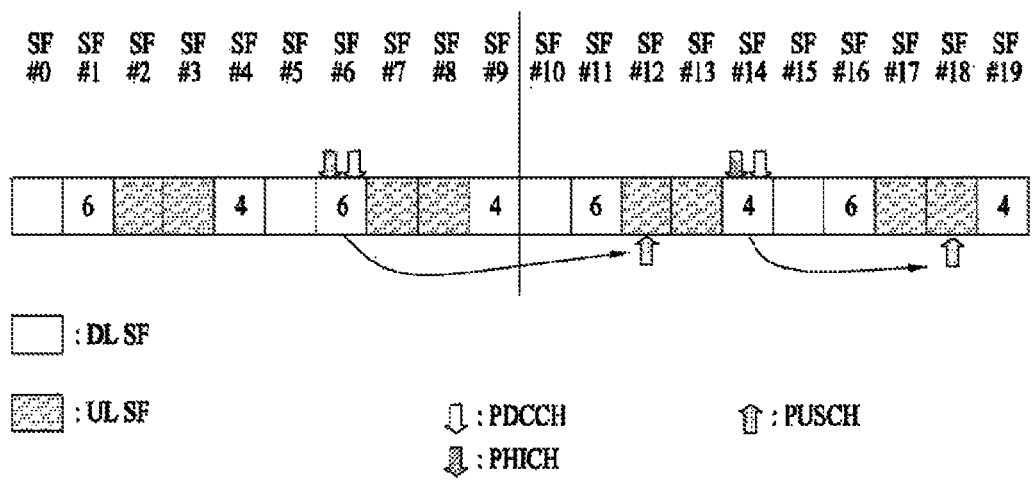

FIGS. 9 and 10 illustrate PHICH/UG-PUSCH timing. A PUSCH can be transmitted corresponding to a PDCCH (UG) and/or a PHICH (NACK).

Referring to FIG. 9, the UE can receive a PDCCH (UL grant) and/or a PHICH (NACK) through a PDCCH (S702). Here, NACK corresponds to an ACK/NACK response to previous PUSCH transmission. In this case, the UE can initially transmit/retransmit one or more TBs through a PUSCH after k subframes via processes for PUSCH transmission (e.g. TB coding, TB-CW swiping, PUSCH resource allocation, etc.) (S704).

Table 5 shows a UAI (Unlink Association Index) (k) for PUSCH transmission in TDD. Table 5 shows spacing between a DL subframe from which a PHICH/UG is detected and a UL subframe relating to the DL subframe. Specifically, when a PHICH/UL grant is detected from a subframe n, the UE can transmit a PUSCH in a subframe n+k. For FDD, k=4.

TABLE 5

| TDD UL-DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | | 4 | 6 | | | | 4 | 6 | | |
| 1 | | | 6 | | 4 | | | 6 | | 4 |
| 2 | | | | 4 | | | | | 4 | |
| 3 | 4 | | | | | | | 4 | 4 | |
| 4 | | | | | | | | 4 | 4 | |
| 5 | | | | | | | | 4 | | |
| 6 | 7 | 7 | | | | 7 | 7 | | | 5 |

FIG. 10 illustrates PUSCH transmission timing when UL-DL configuration #1 is configured. In the figure, SF#0 to #9 and SF#10 to #19 respectively correspond to radio frames, and numerals in blocks denote UL subframes relating to DL subframes. For example, a PUSCH corresponding to PHICH/UL grant of SF#6 is transmitted in SF#6+6 (=SF#12) and a PUSCH corresponding to a PHICH/UL grant of SF#14 is transmitted in SF#14+4 (=SF#18).

Figure 11:
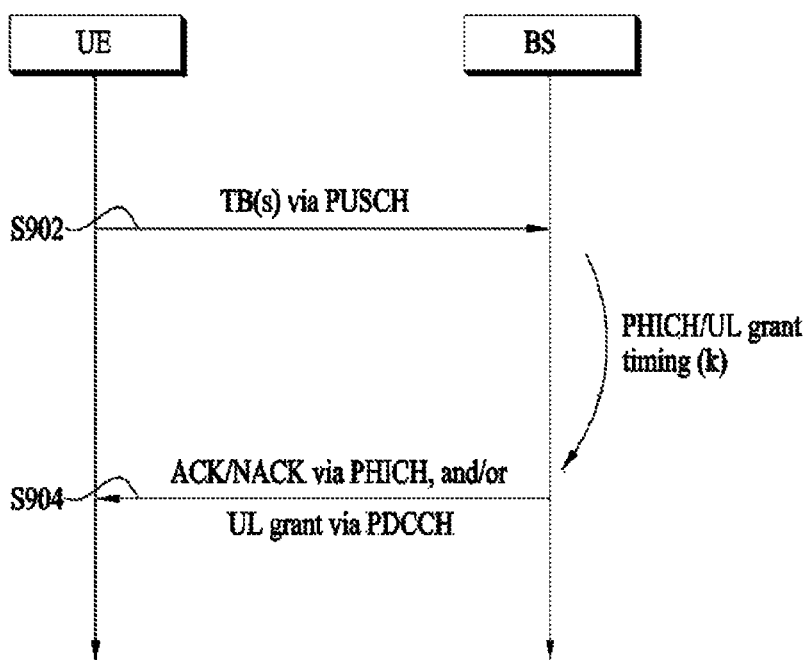
FIGS. 11 and 12 illustrate TDD DL ACK/NACK transmission timing.
Figure 12:
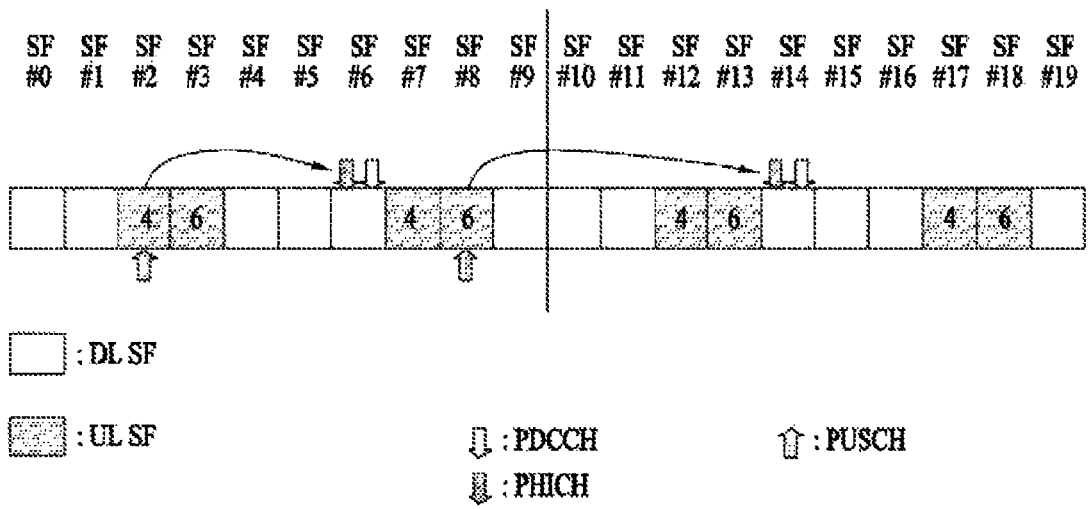

FIGS. 11 and 12 illustrate PUSCH-PHICH/UG timing. A PHICH is used to transmit DL ACK/NACK. Here, DL ACK/NACK means ACK/NACK transmitted on downlink as a response to UL data (e.g. PUSCH).

Referring to FIG. 11, the UE transmits a PUSCH signal to the BS (S902). Here, the PUSCH signal is used to transmit one or a plurality of (e.g. 2) TBs according to transmission mode. The BS can transmit ACK/NACK as a response to PUSCH transmission through a PHICH after k subframes via processes for ACK/NACK transmission (e.g. ACK/NACK generation, ACK/NACK resource allocation, etc.) (S904). ACK/NACK includes acknowledgement information about the PUSCH signal of step S902. When a response to PUSCH transmission is NACK, the BS can transmit a UL grant PDCCH for PUSCH retransmission to the UE after k subframe (S904).

Table 6 shows a UAI for PHICH/UL grant transmission in LTE(-A). Table 6 shows spacing between a DL subframe in which a PHICH/UL grant is present and a UL subframe relating to the DL subframe. Specifically, a PHICH/UL grant of a subframe i corresponds to PUSCH transmission through a subframe i-k. For FDD, k=4.

TABLE 6

| TDD UL-DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | | 4 | | 6 |
| 2 | | | | 6 | | | | | 6 | |
| 3 | 6 | | | | | | | 6 | 6 | |
| 4 | | | | | | | | 6 | 6 | |
| 5 | | | | | | | | 6 | | |
| 6 | 6 | 4 | | | | 7 | 4 | | | 6 |

FIG. 10 illustrates PHICH/UG transmission timing when UL-DL configuration #1 is configured. In the figure, SF#0 to #9 and SF#10 to #19 respectively correspond to radio frames, and numerals in blocks denote DL subframes relating to UL subframes. For example, a PHICH/UL grant corresponding to a PUSCH of SF#2 is transmitted in SF#2+4 (=SF#6) and a PHICH/UL grant corresponding to a PUSCH of SF#8 is transmitted in SF#8+6 (=SF#14).

PHICH resource allocation will now be described. When a PUSCH is transmitted in subframe #n, the UE determines a PHICH resource corresponding to the PUSCH in subframe #(n+$k_{PHICH}$). In case of FDD, $k_{PHICH}$ has a fixed value (e.g. 4). In case of TDD, $k_{PHICH}$ has a value depending on UL-DL configuration. Table 7 shows $k_{PHICH}$ for TDD is equivalent to Table 6.

TABLE 7

| TDD UL-DL Configuration | UL subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | | 4 | 7 |

A PHICH resource is provided by [PHICH group index, orthogonal sequence index]. The PHICH group index and the orthogonal sequence index are determined using (i) a lowest PRB index used for PUSCH transmission and (ii) a 3-bit field value for DMRS (Demodulation Reference Signal) cyclic shift. Here, (i) and (ii) are indicated by a UG PDCCH.

A description will be given of a HARQ process. The UE executes a plurality of parallel HARQ processes for UL transmission. The plurality of parallel HARQ processes is used to continuously perform UL transmission while the UE waits for HARQ feedback representing whether previous UL transmission has been successful or not. Each HARQ process relates to a HARQ buffer of a MAC (Medium Access Control) layer. Each HARQ process manages the number of transmissions of a MAC PDU (Physical Data Unit) in the buffer, HARQ feedback for the MAC PDU in the buffer, and a state parameter regarding a current redundancy version.

In case of FDD, the number of UL HARQ processes is 8. In case of TDD, the number of UL HARQ processes and HARQ RTT (Round Trip Time) are configured differently according to DL-UL configurations because the number of UL subframes depends on UL-DL configuration. Here, the HARQ RTT may be a time interval (in the unit of SF or ms, for example) between a time when a UL grant is received and a time when a PHICH (corresponding to the UL grant) is received through transmission of a PUSCH (corresponding the UL grant) or a time interval between a PUSCH transmission time and a PUSCH retransmission time.

Table 8 shows the number of synchronous UL HARQ processes and HARQ RTT in TDD. When the UL HARQ RTT is 10 [SFs or ms] (UL-DL configurations #1, #2, #3, #4 and #5), one UL HARQ process uses one fixed UL SF timing. When the UL HARQ RTT does not correspond to 10 [SFs or ms] (UL-DL configurations #0 and #6), one UL HARQ process uses a plurality of UL SF timings (instead of one fixed UL SF timing) while hopping. For example, in case of UL-DL configuration #6, PUSCH transmission timings in one UL HARQ process are: SF #2: PUSCH=>SF #13: PUSCH (RTT: 11 SFs)=>SF #24: PUSCH (RTT: 11 SFs)=>SF #37: PUSCH (RTT: 13 SFs)=>SF #48: PUSCH (RTT: 11 SFs)=>SF #52: PUSCH (RTT: 14 SFs).

TABLE 8

| UL-DL configuration | Number of UL SFs | Number of HARQ processes for normal HARQ operation | HARQ RTT |
|---|---|---|---|
| 0 | 6 | 7 | 11 or 13 |
| 1 | 4 | 4 | 10 |
| 2 | 2 | 2 | 10 |
| 3 | 3 | 3 | 10 |
| 4 | 2 | 2 | 10 |
| 5 | 1 | 1 | 10 |
| 6 | 5 | 6 | 11 or 13 or 14 |

Figure 13:
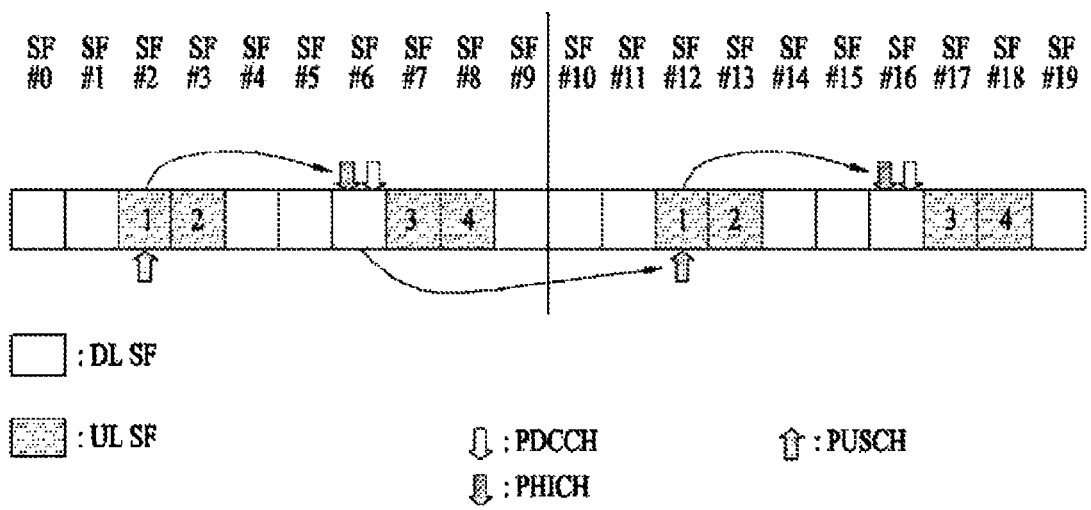
FIG. 13 illustrates a TDD HARQ (Hybrid Automatic Repeat request) process.

FIG. 13 illustrates a synchronous UL HARQ process when UL-DL configuration #1 is configured. Numerals in blocks denote UL HARQ process numbers. The synchronous UL HARQ process shown in FIG. 11 corresponds to a normal HARQ process. Referring to FIG. 11, HARQ process #1 involves SF#2, SF#6, SF#12 and SF#16. For example, if an initial PUSCH signal (e.g. RV=0) is transmitted in SF#2, a UL grant PDCCH and/or a PHICH corresponding to the PUSCH signal can be received in SF#6 and a (retransmission) PUSCH signal (e.g. RV=2) corresponding to the initial PUSCH signal can be transmitted in SF#12. Accordingly, 4 UL HARQ processes having an RTT (Round Trip Time) of 10 SFs (or 10 ms) are present in case of UL-DL configuration #1.

Figure 14:
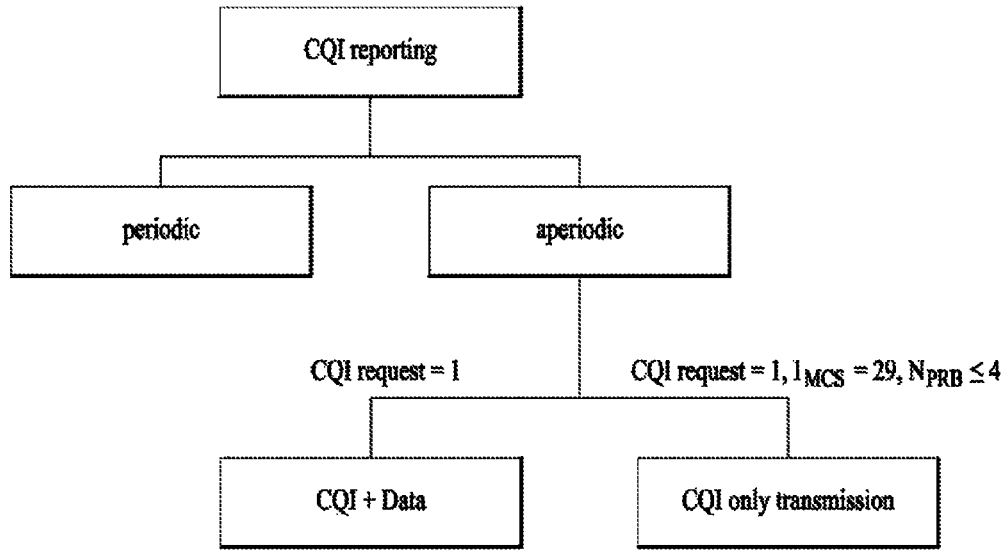
FIG. 14 illustrates a channel status information (CSI) reporting method.

FIG. 14 illustrates a CQI reporting method. Referring to FIG. 14, CQI reporting is divided into periodic reporting and aperiodic reporting. Periodic CQI reporting refers to reporting of CSI by a UE at a fixed time without additional signaling. Aperiodic CQI reporting refers to a method by which a network requests that a UE send a CQI report, through explicit signaling as necessary. When aperiodic CQI reporting is required, the network signals an uplink scheduling grant to the UE using DCI format 0. The UE performs aperiodic CQI reporting when a CQI request value of DCI format 0 is 1. Aperiodic CQI reporting (i.e. CQI request=1) is classified into a CQI only (transmission) mode and a CQI+data (transmission) mode. When the CQI request value is 1, an modulation and coding scheme (MCS) index $I_{MCS}$ is 29 and the number of allocated PRBs is less than 4 ($N_{PRB} \leq 4$), the UE interprets signaling from the network as the CQI only mode. In other cases, the UE interprets signaling from the network as the CQI+data mode. In the CQI only mode, the UE transmits only CSI without data through a PUSCH (i.e. UL-SCH transport block). In the CQI+data mode, the UE transmits CSI and data together through a PUSCH. The CQI only mode may be normalized and called a feedback only mode and the CQI+data mode may be called a feedback+data mode. The CSI includes at least one of CQI, PMI and RI.

Figure 15:
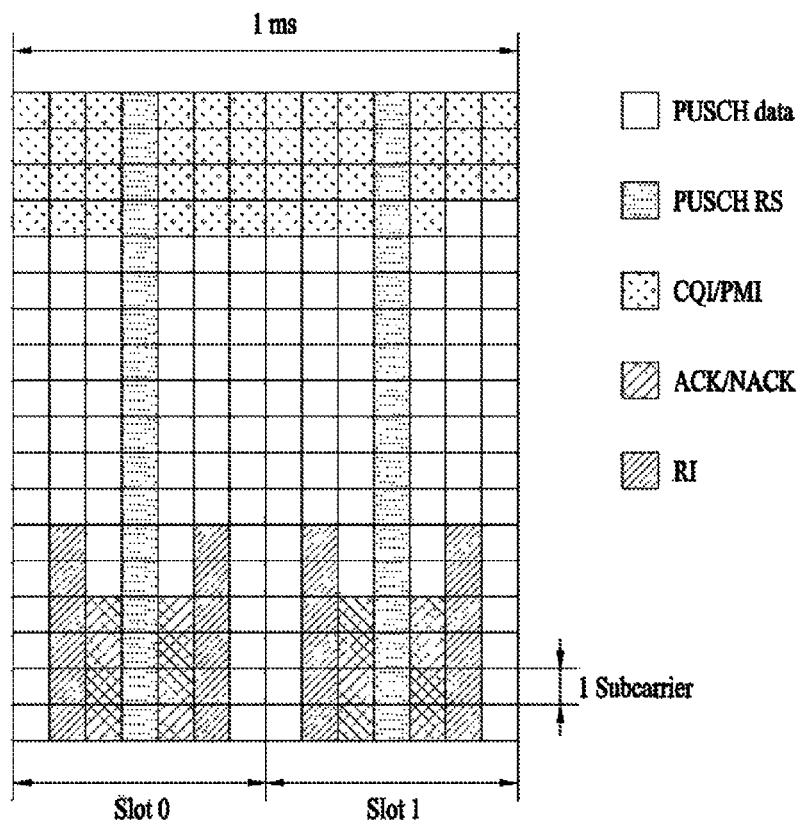
FIG. 15 illustrates a method of transmitting uplink control information through a physical uplink shared channel (PUSCH)

FIG. 15 illustrates a method of transmitting UCI through a PUSCH. When a PUSCH is allocated to a subframe in which UCI transmission is required, UCI can be transmitted through the PUSCH (PUSCH piggybacking). Specifically, for piggybacking of CSI/PMI and RI, PUSCH data (i.e. US-SCH data) is rate-matched in consideration of the quantity of CSI/PMI and RI. ACK/NACK is inserted into part of an SC-FDMA resource to which the UL-SCH data is mapped through puncturing. As described with reference to FIG. 14, the UCI can be scheduled to be transmitted on the PUSCH without UL-SCH data (referred to as a PUSCH without UL-SCH).

When a UE simultaneously transmits an SRS and a PUCCH, the UE may not use the last SC-FDMA symbol of the second slot of the corresponding subframe for PUCCH transmission in order to protect the SRS. For convenience, a PUCCH format in which all SC-FDMA symbols of a subframe are used for PUCCH transmission is referred to as a normal PUCCH format and a PUCCH format in which the last SC-FDMA symbol of the second slot of the subframe is not used for PUCCH transmission is referred to as a shortened PUCCH format. When a PUSCH is allocated to a cell-specific SRS subframe set, the UE may not use the last SC-FDMA symbol of the second slot for PUSCH transmission for the same reason. Specifically, PUSCH data (i.e. UL-SCH data) is rate-matched in consideration of the quantity of resources of the last SC-FDMA symbol. For convenience, a PUSCH transmitted using all SC-FDMA symbols of a subframe is referred to as a normal PUSCH and a PUSCH transmitted without using the last SC-FDMA symbol of the second slot of the subframe is referred to as a rate-matched PUSCH.

A description will be given of a random access procedure. The random access procedure is also referred to as a random access channel (RACH) procedure. The random access procedure is used for various purposes such as initial access, uplink synchronization control, resource allocation and handover. The random access procedure is classified into a contention-based procedure and a dedicated (i.e. non-contention-based) procedure. The contention-based access procedure includes initial access and is generally used, whereas the dedicated random access procedure is restrictively used for handover. In the contention-based random access procedure, a UE randomly selects an RACH preamble sequence. Accordingly, a plurality of UEs can simultaneously transmit the same RACH preamble sequence. This requires a contention resolution process. In the dedicated random access procedure, a UE uses an RACH preamble sequence uniquely allocated thereto by an eNB. Accordingly, the UE can perform the random access procedure without collision with other UEs.

Figure 16:
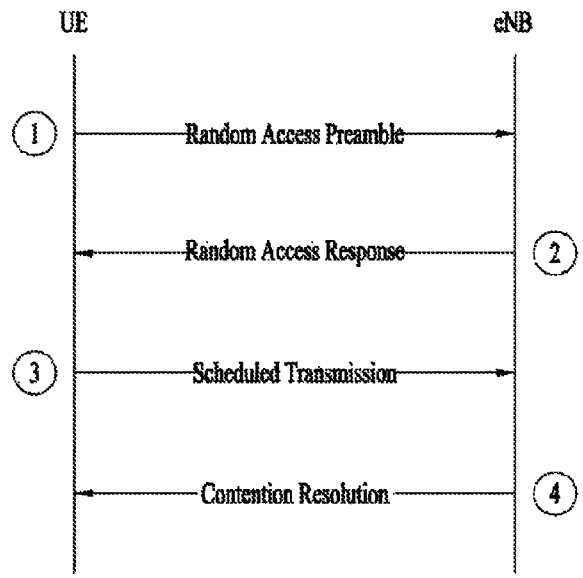
FIGS. 16 and 17 illustrate a random access procedure.

FIG. 16 illustrates a contention-based random access procedure. The contention-based random access procedure includes the following four steps. Messages transmitted in steps 1 to 4 are referred to as messages (Msg) 1 to 4 in the following description.

Step 1: RACH preamble (via PRACH) (UE=>eNB)
Step 2: Random access response (RAR) (via PDCCH and PDSCH) (eNB=>UE)
Step 3: Layer 2/Layer 3 message (via PUSCH) (UE=>eNB)
Step 4: Contention resolution message (eNB=>UE)

Figure 17:
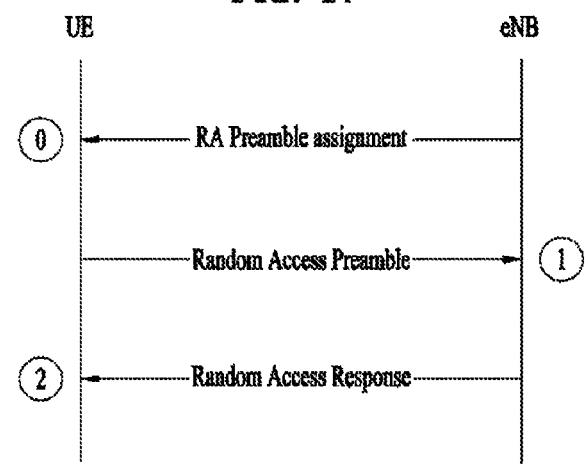

FIG. 17 illustrates a dedicated random access procedure. The dedicated random access procedure includes the following three steps. Messages transmitted in steps 0 to 2 are referred to as messages (Msg) 0 to 2 in the following description. Uplink transmission (i.e. step 3) (not shown) corresponding to an RAR may be performed as part of the random access procedure. The dedicated random access procedure can be triggered using a PDCCH (referred to as a PDCCH order hereinafter) used for the eNB to order RACH preamble transmission.

Step 0: RACH preamble allocation through dedicated signaling (eNB=>UE)
Step 1: RACH preamble (via PRACH) (UE=>eNB)
Step 2: Random access response (RAR) (via PDCCH and PDSCH) (eNB=>UE)

After transmission of the RACH preamble, the UE attempts RAR reception within a preset time window. Specifically, the UE attempts to detect a PDCCH having a random access RNTI (RA-RNTI) (referred to as a RA-RNTI PDCCH hereinafter) within the time window. Upon detection of the RA-RNTI PDCCH, the UE checks whether an RAR for the UE is present in a PDSCH corresponding to the RA-RNTI PDCCH. The RAR may include timing advance (TA) information indicating timing offset information for UL synchronization, UL resource allocation information (UG information) and a temporary UE identifier (e.g. temporary cell-RNTI or TC-RNTI). The UE can perform UL transmission (e.g. transmission of message 3) according to the resource allocation information and TA value included in the RAR. HARQ is applied to UL transmission corresponding to the RAR. Accordingly, the UE can receive reception response information (e.g. PHICH) corresponding to message 3 after transmission of message 2.

Figure 18:
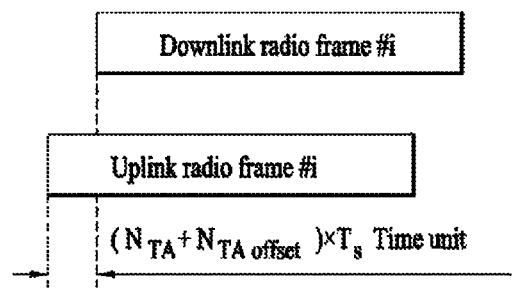
FIG. 18 illustrates uplink-downlink frame timing.

FIG. 18 illustrates an uplink-downlink frame timing relationship.

Referring to FIG. 18, transmission of uplink radio frame #i is started earlier than transmission of a downlink radio frame corresponding thereto by $(N_{TA}+N_{TAoffset})*T_s$ seconds. Here, $0 \leq N_{TA} \leq 20512$, $N_{TAoffset}=0$ FDD and $N_{TAoffset}=624$ in TDD. $N_{TAoffset}$ is a value pre-recognized by an eNB and a UE. When $N_{TA}$ is signaled through a timing advance command in a random access procedure, the UE adjusts transmission timing of a UL signal (e.g., PUCCH/PUSCH/SRS) through the above expression. UL transmission timing is set to a multiple of $16T_s$. $T_s$ indicates sampling time. For example, $T_s$ can be 1/30720 (ms) (refer to FIG. 2). The timing advance command orders UL timing change on the basis of the current UL timing. The timing advance command $T_A$ in a random access response is 11 bits and indicates 0, 1, 2, . . . , 1282, and the timing adjustment value $N_{TA}$ is set as $N_{TA}=T_A*16$. In other cases, the timing advance command $T_A$ is 6 bits and indicates 0, 1, 2, . . . , 63, and the timing adjustment value $N_{TA}$ is set as $N_{TA,new}=N_{TA,old}+(T_A-31)*16$. The UE operates a TA timer upon reception of the TA command (i.e., $N_{TA}$). When the TA timer expires, the UE empties all HARQ buffers, cancels PUCCH/SRS resources and releases all set DL/UL resource allocation. While the TA timer is not operated, the UE cannot transmit any UL signal except for RACH.

Embodiment: Signal Transmission/Processing for Machine Type Communication (MTC)

Systems following LTE-A consider configuration of inexpensive/low-specification UEs for data communication, such as metering, water level measurement, monitoring camera utilization and vending machine inventory reporting. Such UEs are referred to as LC UE type (or LC type UE, LC YUE or MTC UE) for convenience. In the case of LC UE type, the quantity of transmitted data is small and uplink/downlink data transmission/reception are not frequently performed, and thus it is efficient to reduce UE costs and decrease battery consumption on the basis of a low data transfer rate. In addition, the LC UE type has low mobility and hardly changing channel environments. Various coverage enhancement techniques per channel/signal are under discussion in consideration of situations in which the LC UE is installed in coverage-limited places such as buildings, factories and basements. For example, repetitive transmission can be applied to physical channels in consideration of coverage enhancement for the LC UE type. For example, a channel (e.g. PDCCH or PDSCH) having the same information/contents can be repetitively transmitted over a plurality of subframes.

FIG. 19 illustrates repetitive transmission. FIG. 19 shows an example in which repetitive transmission is applied to a UL physical channel/signal, which can be equally applied to a DL physical channel/signal. FIG. 19(a) illustrates a case in which the number of repetitions of ACK/NACK is set to 3. In this case, ACK/NACK is repetitively transmitted three times starting from SF #6. FIG. 19(b) illustrates a case in which an SR transmission interval is set to 10 SFs and the number of SR repetitions is set to 4. When a positive SR is allocated to SF #1 of every radio frame or an SR process is performed at SF #1 of every radio frame, the SR is repetitively transmitted four times starting from SF #1. A system frame number (SFN) corresponds to a radio frame index.

When repetitive transmission is applied to DL/UL channels/signals, transmission durations of the DL/UL channels/signals may overlap. For example, prior to termination of repetitive transmission of HARQ-ACK for DL data reception corresponding to a specific HARQ process (number), DG DCI that schedules DL data corresponding to the same HARQ process (number) can be detected/received. This situation may occur when an eNB detects HARQ-ACK early and attempts to instruct new transmission/retransmission of DL data to be performed before a HARQ-ACK transmission duration is ended, for example. As another example, UG DCI may be detected/received before repetitive transmission of an SR is ended. This situation may occur when the eNB detects the SR early and attempts to allocate UL-SCH transmission resources before an SR repetitive transmission duration is ended. FIG. 20 illustrates a case in which a HARQ-ACK transmission duration and an SR transmission duration overlap.

A description will be given of transmission/reception methods of a UE when transmission durations overlap between DL/UL channels/signals. In the following description, a transmission duration (or repetition duration) refers to a repetitive transmission duration when repetitive transmission is applied to channel/signal transmission, that is, a duration for which a channel/signal is repetitively transmitted or a subframe set in which a channel/signal is repetitively transmitted unless mentioned otherwise. While UE operation is described in the following, operation corresponding to the UE operation may be performed by an eNB.

Handling of Overlap Between DL/UL Channels

Prior to termination of a HARQ-ACK transmission duration for DL data reception corresponding to a specific HARQ process (number), DG DCI that schedules DL data corresponding to the same HARQ process (number) may be detected/received. In addition, a transmission time/duration of HARQ-ACK (e.g. PUCCH) corresponding to a specific HARQ process (number) and a reception time/duration of DL data (e.g. PDSCH) corresponding to the same HARQ process (number) may overlap. In this case, the UE can perform/apply the following operations.

Sol 1-1) The UE stops (repetitive) transmission of HARQ-ACK from a DG DCI detection/reception time (or a time corresponding to the DG DCI detection/reception time+specific subframe offset) or a time when transmission of DL data corresponding to the DG DCI is started.

Sol 1-2) The UE maintains (repetitive) transmission of HARQ-ACK irrespective of the DG DCI (without changing between ACK and NACK).

Sol 1-3) Sol 1-1 is applied when the DG DCI indicates initial transmission (e.g. a new data indicator (NDI) in the DCI is toggled) and Sol 1-2 is applied when the DG DCI indicates retransmission (e.g. the NDI in the DCI is not toggled).

Sol 1-4) Sol 1-1 is applied when a HARQ-ACK response is NACK and Sol 1-3 is applied when the HARQ-ACK response is ACK.

UG DCI may be detected/received prior to termination of a (positive) SR transmission duration. In addition, an SR (e.g. PUCCH) transmission time/duration and a UL data (e.g. PUSCH) transmission time/duration may overlap. In this case, the UE can perform/apply the following operations.

Sol 2-1) The UE stops (repetitive) transmission of a (positive) SR from a UG DCI detection/reception time (or a time corresponding to the UG DCI detection/reception time+specific subframe offset) or a time when transmission of UL data corresponding to the UG DCI is started.

Sol 2-2) The UE maintains (repetitive) transmission of the SR irrespective of the UG DCI (without changing between positive SR and negative SR).

Sol 2-3) Sol 2-1 is applied when the UG DCI does not request aperiodic CSI (without UL-SCH) transmission and Sol 2-2 is applied when the UG DCI requests aperiodic CSI (without UL-SCH) retransmission.

Prior to termination of a transmission duration of UL data (referred to as UL data 1 hereinafter) corresponding to a specific HARQ process (number), UG DCI that schedules UL data (referred to as UL data 2 hereinafter) corresponding to the same HARQ process (number) may be detected/received. In addition, a transmission time/duration of UL data 1 (e.g. PUSCH) and a transmission time/duration of UL data 2 (e.g. PUSCH) may overlap. In this case, the UE can perform/apply the following operation.

Sol 3-1) The UE stops (repetitive) transmission of UL data 1 from a UG DCI detection/reception time (or a time corresponding to the UG DCI detection/reception time+ specific subframe offset) or a time when transmission of UL data 2 corresponding to the UG DCI is started.

Sol 3-2) The UE maintains (repetitive) transmission of UL data 1 irrespective of the UG DCI (without changing PRB/MCS).

Sol 3-3) Sol 3-1 is applied when the UG DCI indicates initial transmission (e.g. an NDI) in the DCI is toggled) and Sol 3-2 is applied when the UG DCI indicates retransmission (e.g. the NDI in the DCI is not toggled).

Handling of Overlap Between UL Channels

Prior to termination of a transmission duration of a UL channel/signal (referred to as Ch1 hereinafter), transmission of another UL channel/signal (referred to as Ch2 hereinafter) may be scheduled/set to be started. In this case, UE operation can be set such that the UE abandons/drops transmission of a specific UL channel/signal and performs only transmission of the other UL channel/signal according to UL channel/signal protection priority. For example, (1) repetitive transmission of Ch1 is stopped before start of transmission of Ch2 or transmission of Ch1 is abandoned/dropped and transmission of Ch2 is started according to scheduled/set timing (Ch1-drop case), or (2) repetitive transmission of Ch1 is maintained according to preset scheduling/setting and transmission of Ch2 is abandoned/dropped or transmission of Ch2 is started after termination of transmission of Ch1 (Ch2-drop case).

The above cases are arranged as follows with reference to FIG. 21. While abandonment/omission of transmission of Ch1 and/or Ch2 may be performed during a channel transmission process (e.g. resource allocation process for channel transmission), the present invention is not limited thereto.

1) Ch1-Drop Case

A. Case in which Ch1 is a periodic channel/signal (e.g., periodic CSI, SR or periodic SRS) and Ch2 is an aperiodic channel/signal (e.g., HARQ-ACK, PUSCH, PRACH or aperiodic SRS)

B. Case in which Ch1 is HARQ-ACK and Ch2 is a PUSCH

C. Case in which Ch1 is a PUSCH and Ch2 is HARQ-ACK

D. Case in which both Ch1 and Ch2 correspond to HARQ-ACK

E. Case in which both Ch1 and Ch2 correspond to a PUSCH

F. Case in which Ch2 is a PRACH (Ch1 being a non-PRACH)

2) Ch2-Drop Case

A. Case in which Ch1 is an aperiodic channel/signal (e.g., HARQ-ACK, PUSCH, PRACH or aperiodic SRS) and Ch2 is a periodic channel/signal (e.g., periodic CSI, SR or periodic SRS)

B. Case in which Ch1 is a PRACH (Ch2 being a non-PRACH)

In the meantime, the SR (particularly, positive SR) may be regarded as an aperiodic channel/signal and, in this case, the Ch1-drop case and Ch2-drop case are arranged as follows.

1) Ch1-Drop Case

A. Case in which Ch1 is a periodic channel/signal (e.g., periodic CSI or periodic SRS) and Ch2 is a (positive) SR B. Case in which Ch1 is an aperiodic channel/signal (e.g., HARQ-ACK, PUSCH or aperiodic SRS) and Ch2 is a (positive) SR C. Case in which Ch1 is a (positive) SR and Ch2 is a PUSCH D. Case in which Ch1 is a (positive) SR and Ch2 is HARQ-ACK 2) Ch2-Drop Case A. Case in which Ch1 is a (positive) SR and Ch2 is a periodic channel/signal (e.g., periodic CSI or periodic SRS)

B. Case in which Ch1 is a (positive) SR and Ch2 is an aperiodic channel/signal (e.g., HARQ-ACK, PUSCH or aperiodic SRS)

C. Case in which Ch1 is a PUSCH and Ch2 is a (positive) SR

D. Case in which Ch1 is HARQ-ACK and Ch2 is a (positive) SR

Alternatively, when transmission durations of a plurality of UL channels/signals overlap, the UL channels/signals may be transmitted according to preset scheduling/setting for durations that do not overlap and transmission of the UL channels/signals may be abandoned/dropped in the overlapping duration. Alternatively, when repetitive transmission is applied to UL channels/signals, the UE can operate on the assumption that transmission durations of UL channels/signals (e.g. SR and HARQ-ACK, SR and PUSCH or HARQ-ACK and PUSCH) are not scheduled/set to overlap. To this end, the eNB can schedule/set the transmission durations such that repetitive durations of UL channels/signals do not overlap. If a Ch1 transmission duration and a Ch2 transmission duration are scheduled/set to overlap, the UE can abandon/drop transmission of Ch1 and/or Ch2 upon recognizing the scheduling/setting as error.

Figure 22:
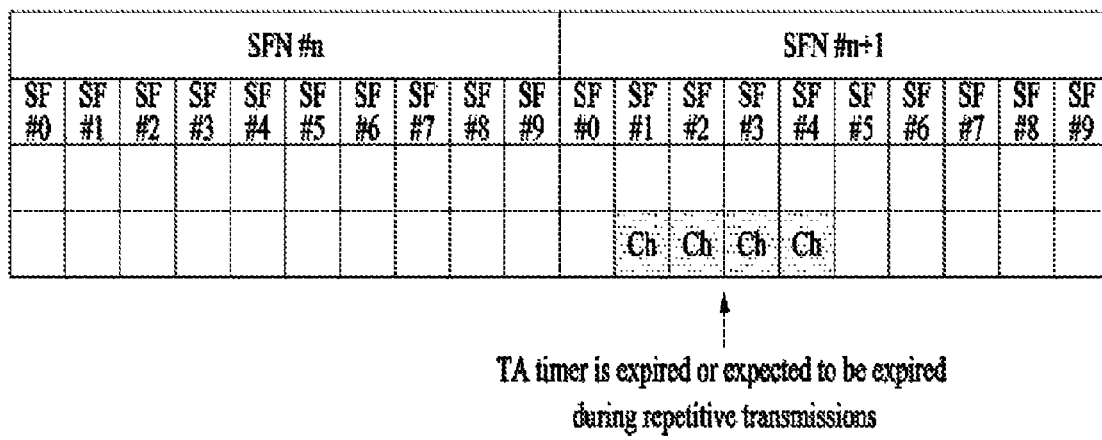
FIG. 22 illustrates a case in which a TA timer expires before repetitive transmission of an uplink channel is ended.

Referring to FIG. 22, a TA timer may expires or be expected to expire before termination of a transmission duration of a UL channel/signal. In this case, the UE can perform the following operations.

Option 1) The UE can abandon/drop repetitive transmission of the UL channel/signal for the entire transmission duration.

Option 2) The UE can perform repetitive transmission of the UL channel/signal for the entire transmission duration. A TA value used for initial transmission of the UL channel/signal can be maintained/applied. An operation related to TA timer expiration (e.g. abandonment of transmission of an arbitrary UL channel/signal (other than a PRACH)) can be applied after termination of repetitive transmission of the corresponding UL channel/signal. In addition, the TA timer expiration related operation may be applied from a TA timer expiration time as in a conventional scheme and transmission may be maintained even after TA timer expiration for repetitive transmission of the corresponding UL channel/signal. That is, when the TA timer is not operated, the UE cannot perform UL channel/signal transmission except for (i) transmission of a PRACH and (ii) repetitive transmission of the UL channel/signal during TA timer termination.

Option 3) The UE can stop repetitive transmission of the UL channel/signal prior to expiration of the TA timer.

The number of PUCCH repetitions may be set per UCI (e.g. HARQ-ACK, SR, or periodic CSI) and a PUCCH resource may be set per UCI. In this case, the UE can operate on the assumption that repetition durations of two pieces of UCI completely overlap (one UCI repetition duration completely includes the other UCI repetition duration in the case of different numbers of repetitions) or are configured completely exclusively (i.e. the repetition durations do not partially overlap). In the case of HARQ-ACK and SR, the same number of PUCCH repetitions is set in consideration of simultaneous transmission (multiplexing) of the HARQ-ACK and SR. However, the present invention is not limited thereto. The numbers of PUCCH repetitions for respective pieces of UCI can be set independently (or equally) and the same PUCCH resource can be allocated to HARQ-ACK and SR. In this case, the UE can operate on the assumption that the HARQ-ACK and SR are not simultaneously transmitted (multiplexed) (that is, repetition durations of the HARQ-ACK and SR are configured exclusively (i.e. the repetition durations do not overlap)). For example, the UE can operate on the assumption that DL scheduling that causes HARQ-ACK transmission is not present in the SR transmission duration. To this end, the eNB may not perform DL scheduling for the SR repetition duration. If DG DCI is detected during the SR repetition duration, the UE can regard the DG DCI as an error and abandon/drop operation according to the DG DCI.

Similarly, the UE can operate on the assumption that a HARQ-ACK PUCCH repetition duration and a PUSCH repetition duration completely overlap or are configured exclusively. To this end, the eNB may not perform UL scheduling for the HARQ-ACK PUCCH repetition duration. If UG DCI is detected for the HARQ-ACK PUCCH repetition duration, the UE can regard the UG DCI as an error and abandon/drop operation (e.g. UL data transmission) according to the UG DCI. In addition, the UE can operate on the assumption that an SR repetition duration and a PUSCH repetition duration completely overlap or are configured exclusively. To this end, the eNB may not perform UL scheduling for the SR repetition duration. If UG DCI is detected for the SR repetition duration, the UE can regard the UG DCI as an error and abandon/drop operation (e.g. UL data transmission) according to the UG DCI.

In the case of SR transmission, an SR PUCCH repetitive transmission start time can be set by a combination of an SFN (and/or the number of SR (PUCCH) repetitive transmissions, or an SR repetition duration) and an SF number/offset. The SR repetition duration may refer to a duration between an SF at which the initial SR PUCCH is transmitted and an SF at which the last SR PUCCH is transmitted. An SR transmission interval can be set to a multiple of the number of SR repetitive transmissions or the SR repetition duration.

Handling of Overlap Between PUCCHs

When a repetitive transmission duration (referred to as an SR duration) of a PUCCH carrying a (positive) SR and a repetitive transmission duration (referred to as a HARQ-ACK duration) of a PUCCH carrying HARQ-ACK overlap (refer to FIG. 20), the UE can perform the following UL transmission operation according to a relationship between the two repetitive transmission durations. For convenience, the number of PUCCH repetitions, set to the (positive) SR duration, is defined as Ns, the number of PUCCH repetitions, set to the HARQ-ACK duration, is defined as Na and the number of PUCCH repetitions, set to the overlapping duration, is defined as No. The following operation can be performed in a UCI resource allocation process (e.g. PUCCH resource allocation process).

1) When SR Transmission and HARQ-ACK Transmission are Started at the Same Time

A. Case in which the SR duration includes the entire HARQ-ACK duration (Ns≥Na)

Alt 1: HARQ-ACK is transmitted Ns times using SR PUCCH resources (for the SR duration).

Alt 2: HARQ-ACK is transmitted Na times using SR PUCCH resources (for the HARQ-ACK duration).

Alt 3: HARQ-ACK is transmitted Na times using SR PUCCH resources (for the SR duration) and then NACK is transmitted (Ns-Na) times using SR PUCCH resources.

B. Case in which the HARQ-ACK duration includes the entire SR duration (Ns<Na)

Alt 1: HARQ-ACK is transmitted Ns times using SR PUCCH resources (for the SR duration).

Alt 2: HARQ-ACK is transmitted Na times using SR PUCCH resources (for the HARQ-ACK duration).

Alt 3: HARQ-ACK is transmitted Ns times using SR PUCCH resources (for the HARQ-ACK duration) and then HACK-ACK is transmitted (Na-Ns) times using HARQ-ACK PUCCH resources.

2) When SR Transmission is Started Prior to HARQ-ACK Transmission

A. Case in which the SR duration includes the entire HARQ-ACK duration (Ns≥Na)

Alt 1: HARQ-ACK is transmitted Ns times using SR PUCCH resources (for the SR duration).

Alt 2: HARQ-ACK is transmitted Na times using SR PUCCH resources (for the HARQ-ACK duration).

Alt 3: HARQ-ACK is transmitted Na times using SR PUCCH resources for the HARQ-ACK duration (for the SR duration) and NACK is transmitted using SR PUCCH resources for the remaining duration.

Alt 4: HARQ-ACK is transmitted using SR PUCCH resources for a duration between a HARQ-ACK duration start time and an SR duration end time (for the SR duration) and NACK is transmitted using SR PUCCH resources for the remaining duration (i.e. before HARQ-ACK duration).

B. Case in which the SR duration includes only part of the HARQ-ACK duration (No<Na)

i. Operation for the SR duration (including a duration overlapping with HARQ-ACK)

Alt 1-1: HARQ-ACK is transmitted Ns times using SR PUCCH resources.

Alt 1-2: HARQ-ACK is transmitted No times using SR PUCCH resources only for the overlapping duration.

Alt 1-3: HARQ-ACK is transmitted No times using SR PUCCH resources for the overlapping duration and NACK is transmitted (Ns-No) times using SR PUCCH resources for the remaining duration.

ii. Operation for the remaining duration (HARQ-ACK duration that does not overlap with SR)
  Alt 2-1: No UCI (PUCCH) is transmitted (drop both).
  Alt 2-2: HARQ-ACK is transmitted (Na-No) times using SR PUCCH resources.
  Alt 2-3: HARQ-ACK is transmitted (Na-No) times using HARQ-ACK PUCCH resources.
  iii. The final UE operation can be considered as a combination of one of Alt 1-1, Alt 1-2 and Alt 1-3 and one of Alt 2-1, Alt 2-2 and Alt 2-3.

3) When HARQ-ACK Transmission is Started Prior to SR Transmission

A. Case in which the HARQ-ACK duration includes the entire SR duration (Na≥Ns)
  Alt 1: HARQ-ACK is transmitted Ns times using SR PUCCH resources (for the SR duration).
  Alt 2: HARQ-ACK is transmitted Na times using SR PUCCH resources (for the HARQ-ACK duration).
  Alt 3: HARQ-ACK is transmitted Ns times using SR PUCCH resources for the SR duration (for the HARQ-ACK duration) and HARQ-ACK is transmitted using HARQ-ACK PUCCH resources for the remaining duration.
  Alt 4: HARQ-ACK is transmitted using SR PUCCH resources for a duration between an SR duration start time and a HARQ-ACK duration end time (for the HARQ-ACK duration) and HARQ-ACK is transmitted using HARQ-ACK PUCCH resources for the remaining duration (i.e. before SR duration).

B. Case in which the HARQ-ACK duration includes only part of the SR duration (No<Ns)
  i. Operation for the HARQ-ACK duration (including a duration overlapping with the SR)
  Alt 1-1: HARQ-ACK is transmitted Na times using SR PUCCH resources.
  Alt 1-2: HARQ-ACK is transmitted No times using SR PUCCH resources only for the overlapping duration.
  Alt 1-3: HARQ-ACK is transmitted No times using SR PUCCH resources for the overlapping duration and HARQ-ACK is transmitted (Na-No) times using HARQ-ACK PUCCH resource for the remaining duration.
  ii. Operation for the remaining duration (SR duration that does not overlap with HARQ-ACK)
  Alt 2-1: No UCI (PUCCH) is transmitted (drop both).
  Alt 2-2: HARQ-ACK is transmitted (Ns-No) times using SR PUCCH resources.
  Alt 2-3: NACK is transmitted (Ns-No) times using SR PUCCH resources.
  iii. The final UE operation can be considered as a combination of one of Alt 1-1, Alt 1-2 and Alt 1-3 and one of Alt 2-1, Alt 2-2 and Alt 2-3.

In the above description, NACK transmission may refer to (positive) SR transmission when HARQ-ACK is not present.

The above scheme can be applied when a PUSCH repetition duration and a HARQ-ACK (PUCCH) repetition duration overlap. In this case, the above description may have the following changes.
  SR (repetitive transmission) duration=>PUSCH (repetitive transmission) duration
  SR PUCCH resource=>PUSCH resource
  HARQ-ACK transmission using SR PUCCH resource=>PUSCH transmission to which multiplexing/piggybacking of HARQ-ACK is applied
  NACK transmission using SR PUCCH resource=>PUSCH transmission to which multiplexing/piggybacking of HARQ-ACK is not applied Handling of Overlap Between RACH Processes A repetition duration of a specific RACH process may be triggered to overlap with a repetition duration of anther RACH process. Here, a RACH process may refer to (PDCCH order reception=>) PRACH preamble transmission=>RA-RNTI based PDCCH detection=>RAR reception=>Msg3 transmission=>Msg4 reception or part of these processes. In this case, the UE can select/perform only one of the two overlapping RACH processes and abandon/drop the other RACH process. For convenience, a RACH process started first is defined as RACH-proc1 and the following RACH process is defined as RACH-proc2.

If selection/execution of RACH-proc2 is determined, the UE can stop UL/DL transmission/reception corresponding to RACH-prod from a RACH-proc2 start time. The RACH-proc2 start time can refer to a PDCCH order reception time (or time corresponding to the PDCCH order reception time+specific subframe offset) or a PRACH preamble (repetitive) transmission (start) time. Specifically, the UE can stop UL/DL signal transmission/reception corresponding to RACH-proc1 for the entire repetition duration of UL/DL signals (e.g. PRACH, RAR, Msg3 and Msg4) of RACH-prod, which overlaps with the RACH-proc2 start time, or stop UL/DL signal transmission/reception corresponding to RACH-proc1 only after the RACH-proc2 start time for the repetition duration of UL/DL signals of RACH-proc1, which overlaps with the RACH-proc2 start time.

When repetition-based RACH processes (durations) (in which repetition is applied to PRACH transmission) overlap as described above, one of the RACH processes can be selected/performed on the basis of the order of overlapping RACH process durations, the number of repetitions of PRACH preamble transmission, which is set to each RACH process, whether the RACH processes correspond to PRACH retransmission due to RAR or Msg4 reception failure is performed, whether the RACH processes are related to PDCCH order, and whether PRACH, RAR, Nsg3 or Msg4 has been performed/received.

Timing to Apply a Command of DCI

A case in which (a maximum of or fixed) Np repetitions are set/applied to PDCCH/EPDCCH transmission can be considered. In this case, the UE can successfully detect DCI even if the UE receives Np or less PDCCH/EPDCCHs according to implementation method. For example, although the eNB repetitively transmits a PDCCH/EPDCCH through Np SFs (e.g. SF #K to SF #(K+Np−1)), the UE can successfully detect DCI only by receiving the repetitively transmitted PDCCH/EPDCCH at initial Nd (<Np) SFs (i.e. SF #K to SF #(K+Nd−1)) according to radio channel situation.

(DG/UG) DCI can include various commands such as a PUCCH/PUSCH TPC command, aperiodic CSI request and aperiodic SRS request. Considering various and flexible UE implementations and possibility of (command application timing) misalignment between the UE and the eNB due to the UE implementations when repetition is set/applied to PDCCH/EPDCCH transmission, it may be necessary to define subframe timing on which command application time is based. Accordingly, when (a maximum of or fixed) Np repetitions are set/applied to PDCCH/EPDCCH transmission, timing to apply a command included in DCI is determined on the basis of timing of the last SF (i.e. Np-th SF) of a PDCCH/EPDCCH repetition duration. That is, the UE can operate on the assumption that the command included in the DCI is received through the last SF (i.e. Np-th SF) corresponding to DCI transmission irrespective of DCI detection time.

For example, if a PDCCH/EPDCCH repetition start time corresponds to SF #K and the (maximum or fixed) number of repetitions of the PDCCH/EPDCCH is set to Np, the UE can successfully detect UG DCI that signals an aperiodic CSI transmission request only by receiving the PDCCH/EPDCCH repetitively transmitted through first Nd (<Np) SFs (i.e SF #K to SF #(K+Nd−1)). In this case, although the UG DCI has been detected at SF #(K+Nd−1), the aperiodic CSI transmission request can be applied on the basis of the last SF #(K+Np−1). That is, the UE can consider/assume that the UG DCI signaling the aperiodic CSI transmission request has been detected at SF #(K+Np−1). Accordingly, the UE can determine a corresponding CSI measurement/calculation resource as SF #(K+Np−1) (or on the basis of the SF). Alternatively, if an aperiodic SRS transmission request is signaled through DCI under the same condition, the aperiodic SRS transmission request can be applied on the basis of the last SF #(K+Np−1). That is, the UE can consider/assume that the DCI signaling the aperiodic SRS transmission request has been detected at SF #(K+Np−1) and transmit an SRS signal through an aperiodic SRS transmittable subframe determined on the basis of SF #(K+Np−1) (e.g. including and closest to a subframe corresponding to the aperiodic SRS transmittable subframe+SF offset (e.g. 4 SFs)).

In the case of LC UE type (in which repetition is applied to channel/signal transmission), a plurality of (Nc) DL SFs may be configured to correspond to one aperiodic CSI report. That is, a plurality of (Nc) DL SFs can be configured to be a measurement object for calculation of one piece of DL CSI. To this end, Nc, an SF offset (Tc) between UG timing and (aperiodic) CSI measurement timing and/or DL SF candidates (i.e. CSI candidate DL SFs) that can be (aperiodic) CSI measurement objects can be set through higher layer signaling (e.g. RRC signaling). Accordingly, the UE can perform CSI measurement/calculation over Nc consecutive DL SFs (or CSI candidate DL SFs) from the last SF (i.e. Np-th SF) (or timing corresponding to the last SF+Tc) corresponding to a UG repetition duration for which aperiodic CSI transmission request is signaled. To this end, a UG-PUSCH delay may be set differently for a PUSCH carrying aperiodic CSI and a PUSCH carrying no aperiodic CSI, and a larger UG-PUSCH delay may be set for the PUSCH carrying aperiodic CSI. For example, the UG-PUSCH delay for the PUSCH carrying no aperiodic CSI can be set to k and the UG-PUSCH delay for the PUSCH carrying aperiodic CSI can be set to a value greater than k. Here, k may be 4 in FDD and may be set according to Table 5 in TDD. Specifically, the UG-PUSCH delay in the PUSCH carrying aperiodic CSI can be set to k+Nc or k+Tc+Nc.

In the case of LC UE type, a plurality of (Ns) UL SFs can be configured to correspond to one aperiodic SRS transmission. That is, a plurality of (Ns) UL SFs can be configured to be an object for transmitting one SRS (e.g. SRS is repetitively transmitted in the same frequency band/RG region) or an object for transmitting a plurality of SRSs (e.g. SRSs are sequentially transmitted in different frequency bands/RB regions), for one UL CSI measurement. To this end, Ns, an SF offset (Ts) between DG/UG DCI timing and (aperiodic) SRS transmission timing, UL SF candidates (i.e. SRS candidate UL SFs) that can be (aperiodic) SRS transmission objects and/or aperiodic SRS transmission (repetition start) available SF timing can be set through higher layer signaling (e.g. RRC signaling). Accordingly, the UE can transmit a single (identical) or multiple (different) SRS signals over Ns consecutive UL SFs (or SRS candidate UL SFs) from an aperiodic SRS transmittable subframe including/following and closest to the last SF (i.e. Np-th subframe) (or timing corresponding to Np-th subframe+Ts) corresponding to a DG/UG DCI repetition duration for which an aperiodic SRS transmission request is signaled. When the aperiodic SRS transmission request is signaled through DG/UG DCI, an SRS signal corresponding to DCI may be transmitted over all or some specific UL SFs included in a scheduled PDSCH/PUSCH repetitive transmission duration.

In the case of aperiodic SRS transmission, SRS repetitive transmission (start) available timing (i.e. a-SRS timing) can be set by a combination of SFN (and/or the number of SRS repetitions, which is set to aperiodic SRS transmission, or an SF duration for which one SRS repetition is configured) and SF number/offset. An a-SRS transmission interval can be set to a multiple of the number of SRS repetitions, which is set to aperiodic SRS transmission, or the SF duration for which one SRS repetition is configured (e.g. duration between the SF at which the initial SRS is transmitted and the SF at which the last SRS is transmitted).

Separate (Additional) Repetition According to Content/Format

Separate numbers of repetitions can be independently set for a PUSCH that carries (piggybacks) UCI and a normal PUSCH that does not carry UCI (e.g. a larger number of repetitions is applied to the PUSCH carrying UCI). In addition, separate numbers of repetitions can be independently set for a PUSCH corresponding to UG DCI through which aperiodic CSI transmission request is signaled and a PUSCH (through which aperiodic CSI transmission request is not signaled) (e.g. a larger number of repetitions is applied to the former).

In addition, separate numbers of repetitions can be independently set for a PUSCH (or PUSCH repetition including PUSCH transmission) in which rate-matching or puncturing is applied to some specific resources (e.g. last SC-FDMA symbol or REs adjoining a DMRS) for simultaneous SRS transmission/signal protection or UCI (e.g. HARQ-ACK and CSI) transmission, and other PUSCHs (e.g. a large number of repetitions is applied to the former).

Furthermore, separate numbers of repetitions can be independently set for a shortened format based PUCCH (or PUCCH repetition including shortened format PUCCH transmission) that does not use some specific resources (e.g. last SC-FDMA symbol) for simultaneously SRS transmission/signal protection, and other PUCCHs (e.g. a large number of repetitions is applied to the former).

In the case of DCI transmission, an independent number of PDCCH/EPDCCH repetitions can be set per DCI format type and/or payload size. For example, different numbers of repetitions can be respectively applied to a TM-common DCI format (e.g. DCI formats 0/1A), a DL TM-dedicated DCI format (e.g. DCI formats 1/1B/1D/2/2A/2B/2C/2D), and a UL TM-dedicated DCI format (e.g. DCI format 4). In addition, different numbers of repetitions can be respectively applied to DCI format 1A and DCI format 1C which have different payload sizes.

Figure 23:
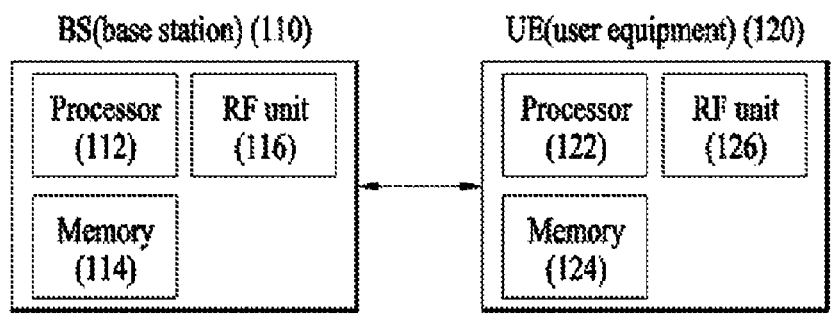
FIG. 23 is a block diagram of a base station (BS) and a user equipment (UE) according to an embodiment of the present invention.

FIG. 23 is a block diagram of a BS and a UE which are applicable to an embodiment of the present invention.

Referring to FIG. 23, a wireless communication system includes a BS 110 and a UE 120. A transmitter is a part of the BS 110 and a receiver is a part of the UE 120 on DL. A transmitter is a part of the UE 120 and a receiver is a part of the BS 110 on UL. The BS 110 includes a processor 112, a memory 114, and a Radio Frequency (RF) unit 116. The processor 112 may be configured to implement the procedures and/or methods proposed by the present invention. The memory 114 is connected to the processor 112 and stores various types of information related to operations of the processor 112. The RF unit 116 is connected to the processor 112 and transmits and/or receives radio signals. The UE 120 includes a processor 122, a memory 124, and an RF unit 126. The processor 122 may be configured to implement the procedures and/or methods proposed by the present invention. The memory 124 is connected to the processor 122 and stores various types of information related to operations of the processor 122. The RF unit 126 is connected to the processor 122 and transmits and/or receives radio signals. The BS 110 and/or the UE may have a single antenna or multiple antennas.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment. It is obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made, centering on a data transmission and reception relationship between a BS and a UE. In some cases, a specific operation described as performed by the BS may be performed by an upper node of the BS. Namely, it is apparent that, in a network comprised of a plurality of network nodes including a BS, various operations performed for communication with a UE may be performed by the BS or network nodes other than the BS. The term 'BS' may be replaced with the term fixed station, Node B, evolved Node B (eNode B or eNB), Access Point (AP), etc. The term 'terminal' may be replaced with the term UE, Mobile Station (MS), Mobile Subscriber Station (MSS), Subscriber Station (SS), etc.

The embodiments of the present invention may be achieved by various means, for example, hardware, firmware, software, or a combination thereof. In a hardware configuration, the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to methods of transmitting signals in a wireless communication system and apparatuses therefor.

The invention claimed is:

1. A method of transmitting an uplink channel by a user equipment (UE) in a wireless communication, comprising:
    performing a physical uplink control channel (PUCCH) resource allocation process for repetitive transmission of a scheduling request (SR); and
    performing the PUCCH resource allocation process for repetitive transmission of HARQ-ACK,
    wherein transmission of at least one of the SR and the HARQ-ACK is controlled according to one or more conditions when a repetitive transmission duration of the SR and a repetitive transmission duration of the HARQ-ACK overlap,
    wherein the number of repetitions set to the SR is Ns, the number of repetitions set to the HARQ-ACK is Na, and the number of repetitions of overlapping of the repetitive transmission duration of the SR and the repetitive transmission duration of the HARQ-ACK is No, where Ns, Na and No represent a positive integer, respectively.

2. The method according to claim 1, wherein, when transmission of the SR and transmission of the HARQ-ACK start at the same time and when the repetitive transmission duration of the SR includes the entire repetitive transmission duration of the HARQ-ACK, the HARQ-ACK is transmitted Ns times using PUCCH resources for the SR for the repetitive transmission duration of the SR.

3. The method according to claim 1, wherein, when transmission of the SR and transmission of the HARQ-ACK start at the same time and when the repetitive transmission duration of the SR includes the entire repetitive transmission duration of the HARQ-ACK, the HARQ-ACK is transmitted Na times using PUCCH resources for the SR only for the repetitive transmission duration of the HARQ-ACK.

4. The method according to claim 1, wherein, when transmission of the SR and transmission of the HARQ-ACK start at the same time and when the repetitive transmission duration of the SR includes the entire repetitive transmission duration of the HARQ-ACK, the HARQ-ACK is transmitted Na times using PUCCH resources for the SR for the repetitive transmission duration of the SR and then NACK is transmitted (Ns-Na) times using PUCCH resources for the SR.

5. The method according to claim 1, wherein PUCCH resources allocated to the SR differ from PUCCH resources allocated to the HARQ-ACK, and the repetitive transmission duration of the SR and the repetitive transmission duration of the HARQ-ACK are configured to completely overlap.

6. The method according to claim 1, wherein PUCCH resources allocated to the SR are identical to PUCCH resources allocated to the HARQ-ACK, and the repetitive transmission duration of the SR and the repetitive transmission duration of the HARQ-ACK are configured not to overlap.

7. The method according to claim 1, wherein the one or more conditions include priorities of the SR and the HARQ-ACK.

8. The method according to claim 7, where only a transmission of the HARQ-ACK is performed at an overlapping duration of the repetitive transmission duration of the SR and the repetitive transmission duration of the HARQ-ACK when the repetitive transmission duration of the SR and the repetitive transmission duration of the HARQ-ACK overlap.

9. The method according to claim 8, where a transmission of the SR is dropped at the overlapping duration of the repetitive transmission duration of the SR and the repetitive transmission duration of the HARQ-ACK.

10. A UE used in a wireless communication, comprising:
a radio frequency (RF) unit; and
a processor,
wherein the processor is configured to perform a PUCCH resource allocation process for repetitive transmission of an SR, and to perform the PUCCH resource allocation process for repetitive transmission of HARQ-ACK,
wherein transmission of at least one of the SR and the HARQ-ACK is controlled according to one or more conditions when a repetitive transmission duration of the SR and a repetitive transmission duration of the HARQ-ACK overlap,
wherein the number of repetitions set to the SR is Ns, the number of repetitions set to the HARQ-ACK is Na, and the number of repetitions of overlapping of the repetitive transmission duration of the SR and the repetitive transmission duration of the HARQ-ACK is No.

11. The UE according to claim 10, wherein, when transmission of the SR and transmission of the HARQ-ACK start at the same time and when the repetitive transmission duration of the SR includes the entire repetitive transmission duration of the HARQ-ACK, the HARQ-ACK is transmitted Ns times using PUCCH resources for the SR for the repetitive transmission duration of the SR.

12. The UE according to claim 10, wherein, when transmission of the SR and transmission of the HARQ-ACK start at the same time and when the repetitive transmission duration of the SR includes the entire repetitive transmission duration of the HARQ-ACK, the HARQ-ACK is transmitted Na times using PUCCH resources for the SR only for the repetitive transmission duration of the HARQ-ACK.

13. The UE according to claim 10, wherein, when transmission of the SR and transmission of the HARQ-ACK start at the same time and when the repetitive transmission duration of the SR includes the entire repetitive transmission duration of the HARQ-ACK, the HARQ-ACK is transmitted Na times using PUCCH resources for the SR for the repetitive transmission duration of the SR and then NACK is transmitted (Ns-Na) times using PUCCH resources for the SR.

14. The UE according to claim 10, wherein PUCCH resources allocated to the SR differ from PUCCH resources allocated to the HARQ-ACK, and the repetitive transmission duration of the SR and the repetitive transmission duration of the HARQ-ACK are configured to completely overlap.

15. The UE according to claim 10, wherein PUCCH resources allocated to the SR are identical to PUCCH resources allocated to the HARQ-ACK, and the repetitive transmission duration of the SR and the repetitive transmission duration of the HARQ-ACK are configured not to overlap.

16. The UE according to claim 10, wherein the one or more conditions include priorities of the SR and the HARQ-ACK.

17. The UE according to claim 16, where only a transmission of the HARQ-ACK is performed at an overlapping duration of the repetitive transmission duration of the SR and the repetitive transmission duration of the HARQ-ACK when the repetitive transmission duration of the SR and the repetitive transmission duration of the HARQ-ACK overlap.

18. The UE according to claim 17, where a transmission of the SR is dropped at the overlapping duration of the repetitive transmission duration of the SR and the repetitive transmission duration of the HARQ-ACK.

* * * * *